(12) United States Patent
Rogers et al.

(10) Patent No.: US 11,112,948 B2
(45) Date of Patent: Sep. 7, 2021

(54) DYNAMIC PREVIEW IN A FILE BROWSER INTERFACE

(71) Applicant: Dropbox, Inc., San Francisco, CA (US)

(72) Inventors: Alan Rogers, Fitzroy North (AU); Parker Wilf, San Francisco, CA (US); Robert Mason, San Francisco, CA (US); Tomaz Nedeljko, San Francisco, CA (US); Evan Tana, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/965,259

(22) Filed: Apr. 27, 2018

(65) Prior Publication Data
US 2019/0332231 A1 Oct. 31, 2019

(51) Int. Cl.
G06F 3/0484 (2013.01)
G06F 3/0483 (2013.01)
G06F 3/0482 (2013.01)

(52) U.S. Cl.
CPC .......... *G06F 3/0484* (2013.01); *G06F 3/0482* (2013.01); *G06F 3/0483* (2013.01)

(58) Field of Classification Search
CPC ..... G06F 3/0484; G06F 3/0482; G06F 3/0483
See application file for complete search history.

(56) References Cited

U.S. PATENT DOCUMENTS

| | | | |
|---|---|---|---|
| 4,815,029 A * | 3/1989 | Barker | G06F 3/04842 700/83 |
| 6,266,683 B1 | 7/2001 | Yehuda et al. | |
| 7,769,794 B2 | 8/2010 | Moore et al. | |
| 8,291,014 B2 | 10/2012 | Cierniak et al. | |
| 8,548,992 B2 | 10/2013 | Abramoff et al. | |
| 8,666,993 B2 | 3/2014 | Chunilal | |
| 8,732,600 B2 | 5/2014 | Robert et al. | |
| 8,812,447 B1 | 8/2014 | Anderson et al. | |
| 8,825,597 B1 | 9/2014 | Houston et al. | |
| 8,825,618 B2 | 9/2014 | Martin, Jr. et al. | |

(Continued)

FOREIGN PATENT DOCUMENTS

| | | |
|---|---|---|
| EP | 3 156 900 A1 | 4/2017 |
| WO | 2016063147 A1 | 4/2016 |

OTHER PUBLICATIONS

Invitation to Pay Additional Fees and Partial International Search report for PCT Application No. PCT/US2019/014882 dated Mar. 28, 2019, 16 pages.

(Continued)

*Primary Examiner* — Mandrita Brahmachari
(74) *Attorney, Agent, or Firm* — Polsinelli PC

(57) ABSTRACT

The present technology pertains to a details pane that is displayed in coordination with a file explorer interface. The details pane can display details including activities, comments, and previews for content items displayed in the details pane. In some embodiments the content items displayed in the file explorer interface can be stored in and accessed from different services, and the details in the details pane can also be populated from diverse sources. In some embodiments, edits or navigations can be performed within a preview of the content item. In some embodiments, comments can be shown along with previews that show the comment located within the content item.

21 Claims, 22 Drawing Sheets

(56) References Cited

U.S. PATENT DOCUMENTS

| | | |
|---|---|---|
| 9,063,912 B2 | 6/2015 | Seibert, Jr. et al. |
| 9,374,329 B2 | 6/2016 | Lynch et al. |
| 9,395,893 B1* | 7/2016 | Beausoleil ............ G06F 40/166 |
| 9,430,449 B2 | 8/2016 | Leblond et al. |
| 9,477,673 B2 | 10/2016 | Dwan et al. |
| 9,535,883 B2 | 1/2017 | Pan et al. |
| 9,697,258 B2 | 7/2017 | Barton |
| 9,805,106 B2 | 10/2017 | McErlean et al. |
| 10,013,396 B2 | 7/2018 | Horn et al. |
| 10,025,758 B2 | 7/2018 | Brown et al. |
| 10,243,899 B2 | 3/2019 | Homsany |
| 10,334,069 B2 | 6/2019 | Barton |
| 10,719,807 B2 | 7/2020 | Newhouse et al. |
| 2001/0028363 A1 | 10/2001 | Nomoto et al. |
| 2003/0009685 A1 | 1/2003 | Choo et al. |
| 2004/0230599 A1* | 11/2004 | Moore ................. G06F 3/0481 |
| 2005/0251748 A1* | 11/2005 | Gusmorino ........... G06F 16/168 |
| | | 715/713 |
| 2006/0036568 A1 | 2/2006 | Moore et al. |
| 2006/0215202 A1* | 9/2006 | Nakata ................. G06F 3/1204 |
| | | 358/1.13 |
| 2006/0277460 A1* | 12/2006 | Forstall .............. G06F 16/9577 |
| | | 715/234 |
| 2007/0083520 A1 | 4/2007 | Shellen et al. |
| 2007/0209005 A1* | 9/2007 | Shaver ................. G06F 16/958 |
| | | 715/733 |
| 2008/0020364 A1* | 1/2008 | Wattendorf ............. G09B 5/00 |
| | | 434/322 |
| 2009/0182778 A1 | 7/2009 | Tormasov |
| 2009/0254529 A1 | 10/2009 | Goldentouch |
| 2011/0041094 A1 | 2/2011 | Robert et al. |
| 2011/0099471 A1* | 4/2011 | Manijak ................ G06Q 10/06 |
| | | 715/274 |
| 2011/0208822 A1 | 8/2011 | Rathod |
| 2011/0238836 A1 | 9/2011 | Henderson |
| 2012/0036460 A1 | 2/2012 | Cieplinski et al. |
| 2012/0078845 A1* | 3/2012 | Kasbekar ............. G06Q 10/107 |
| | | 707/640 |
| 2012/0110515 A1* | 5/2012 | Abramoff ............ G06F 16/904 |
| | | 715/854 |
| 2012/0150971 A1 | 6/2012 | Bahrainwala et al. |
| 2013/0191339 A1 | 7/2013 | Haden et al. |
| 2013/0198600 A1 | 8/2013 | Lockhart et al. |
| 2014/0019853 A1* | 1/2014 | Peterson ................ G06F 17/24 |
| | | 715/256 |
| 2014/0033015 A1* | 1/2014 | Shaver ................. G06F 40/169 |
| | | 715/233 |
| 2014/0040812 A1* | 2/2014 | Kurtz ................... G06F 3/0482 |
| | | 715/781 |
| 2014/0101601 A1* | 4/2014 | Tang ...................... G06F 16/29 |
| | | 715/781 |
| 2014/0164534 A1 | 6/2014 | Fushman et al. |
| 2014/0195550 A1 | 7/2014 | Balakrishnan et al. |
| 2014/0222917 A1 | 8/2014 | Poirier |
| 2014/0244618 A1 | 8/2014 | Lynch et al. |
| 2014/0337458 A1 | 11/2014 | Barton |
| 2014/0359023 A1 | 12/2014 | Homsany |
| 2015/0089402 A1* | 3/2015 | Rong ..................... G06Q 50/01 |
| | | 715/760 |
| 2015/0101021 A1 | 4/2015 | Mc Erlean et al. |
| 2015/0161080 A1* | 6/2015 | Sharp ................... G06F 17/212 |
| | | 715/203 |
| 2015/0172239 A1 | 6/2015 | Lynch et al. |
| 2015/0278168 A1* | 10/2015 | Hawa ................... G06F 16/275 |
| | | 715/205 |
| 2015/0378995 A1 | 12/2015 | Brown et al. |
| 2016/0117289 A1* | 4/2016 | Pan ...................... G06F 17/212 |
| | | 715/230 |
| 2016/0164814 A1 | 6/2016 | Landau |
| 2016/0224517 A1* | 8/2016 | Horn ....................... H04L 67/02 |
| 2016/0313882 A1* | 10/2016 | Brown ................. G06F 16/986 |
| 2016/0323217 A1 | 11/2016 | Subramani et al. |
| 2017/0003870 A1 | 1/2017 | Dwan et al. |
| 2017/0109010 A1 | 4/2017 | Mizrachi et al. |
| 2017/0147185 A1 | 5/2017 | Milvaney et al. |
| 2019/0179876 A1* | 6/2019 | Zhang ................. G06F 16/1794 |
| 2019/0325070 A1 | 10/2019 | Kov cs |

OTHER PUBLICATIONS

Non-Final Office Action from U.S. Appl. No. 15/964,804, dated Oct. 21, 2019, 19 pages.

Non-Final Office Action from U.S. Appl. No. 15/964,782, dated Jan. 27, 2020, 11 pages.

* cited by examiner

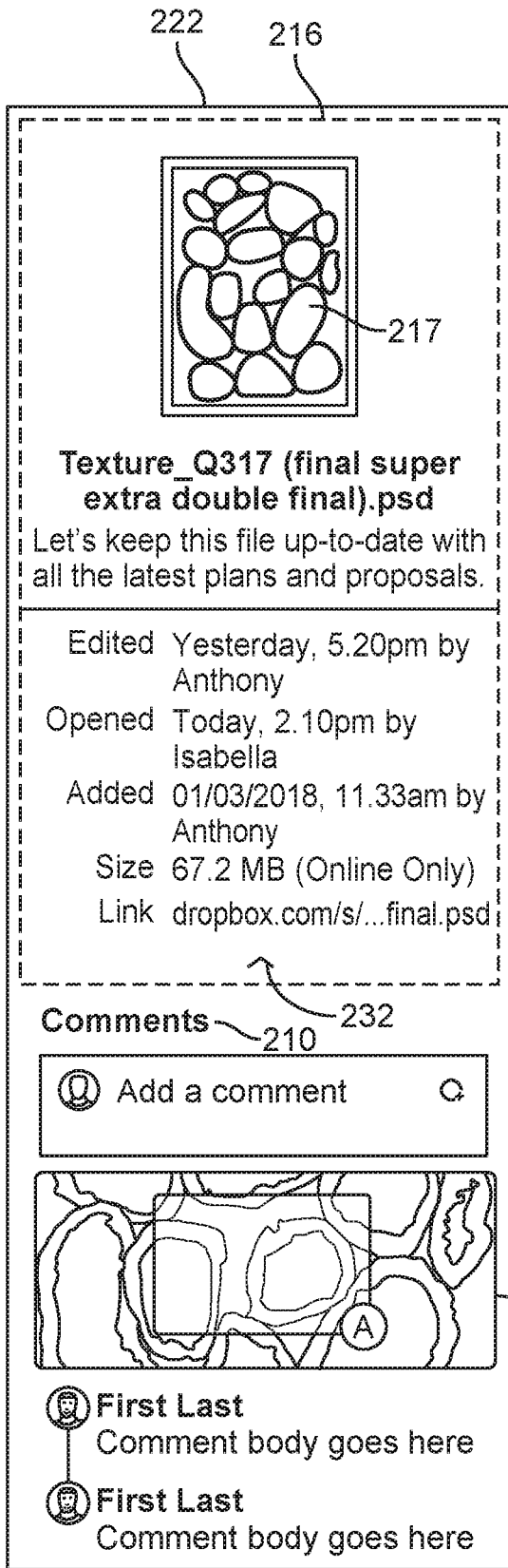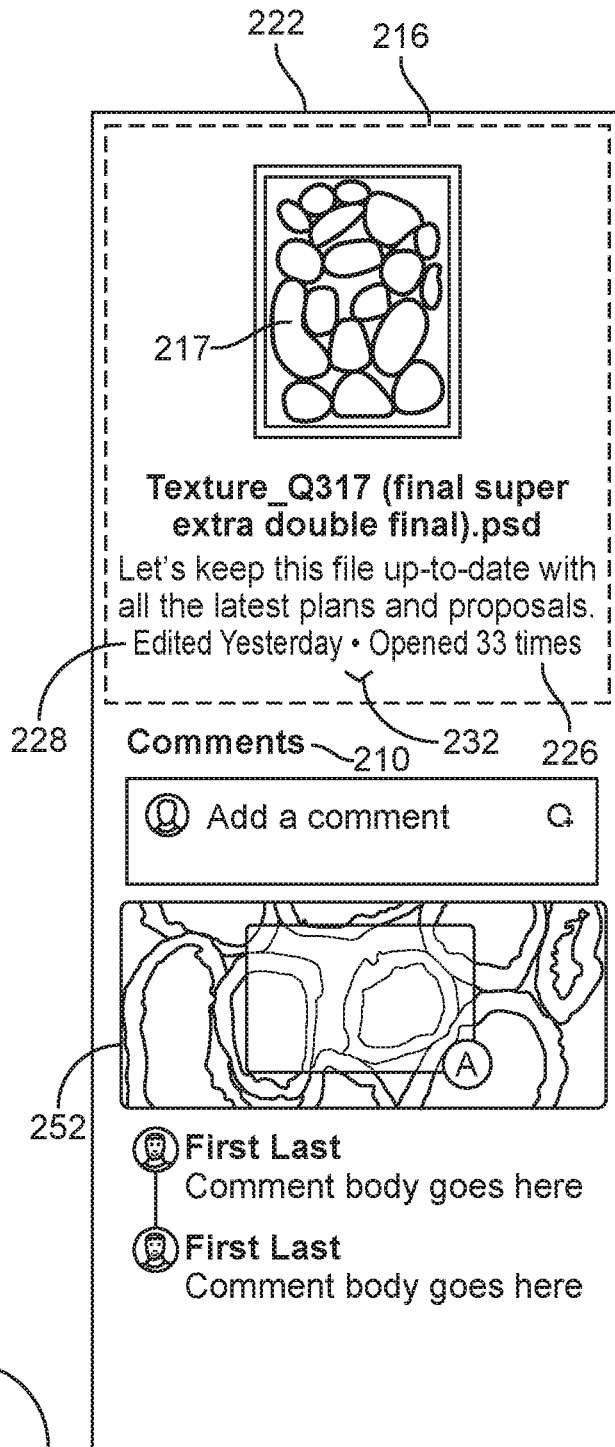
FIG. 12A
FIG. 12B

Master Nov TODOs

Final Steps
○ Final audit of typefaces and images
○ Package up final indd for print
○ Send package to Clive Tom
☑ ~~P64-66 final typesetting~~
☑ ~~P72-80 address @ john feedb...~~
○ P115-125 switch to newer cut of ty...

Jenny — 232

Comments — 210

[👤] Add a comment  ↻

Visual Details
...keep track of the major milestones
and overall launch plan, as well as..

(👤) John
Let's use this one for P55

(👤) You
Sounds good, will update the
master once Danie has finished
putting together the copy for...

Activity — 206

(👤) James Brown marked 2 items
as complete (👤) William smith opened this doc

Master Nov TODOs

Final Steps
○ Final audit of typefaces and images
○ Package up final indd for print
○ Send package to Clive Tom
☑ ~~P64-66 final typesetting~~
☑ ~~P72-80 address @ john feedb...~~
○ P115-125 switch to newer cut of ty...

Jenny
○ Sign off on all article content
☑ ~~Final proofread for P80-85~~
☑ ~~Final proofread for P24-28~~
☑ ~~Final proofread pasadena article~~
○ Rewrite cover caption re: Eva's fee...
○ Fix back cover paragraph 2 (gramm...)
○ Check all pages for truncation issues Eva
☑ ~~Final proofread pasadena article~~
○ Rewrite cover caption re: Eva's fee...
○ Approve color proofs (ask Tom f...
○ Update the Basecamp tickets
○ Add progress to team weekly Bruce
☑ ~~Check ad inventory against final la...~~
☑ Export more and less aggressive v...
○ Get liability sign-off (Part A)
○ Get liability sign-off (Part B)
○ Add digital assets to relevant places

FIG. 17B

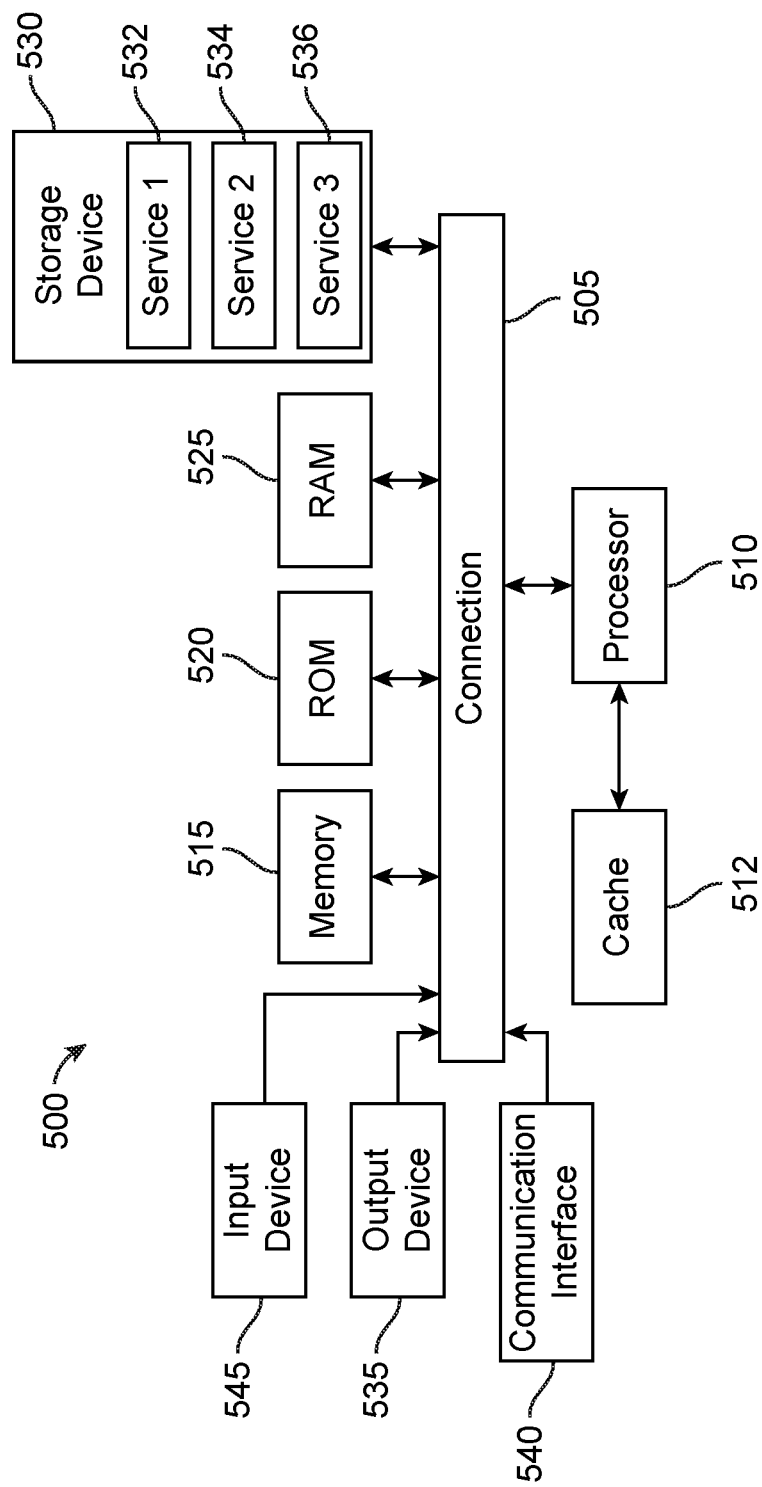

DYNAMIC PREVIEW IN A FILE BROWSER INTERFACE

TECHNICAL FIELD

The present technology pertains to a graphical user interface for displaying details pertaining to content items, and more specifically pertains to displaying details pertaining to several content items in a folder in a file explorer interface.

BACKGROUND

Traditional file explorer applications and associated user interfaces were built for an outdated environment. Specifically, they were built for displaying content items stored in one location, such as content items stored locally, or content items stored in networked storage. These traditional file explorer applications are now outdated.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3 shows an example file system explorer including a details pane showing activity metadata and comments for a sub-folder in accordance with some aspects of the present technology;

FIG. 9 shows an example file system explorer including a details pane showing activity metadata, comments, and a dynamic preview for a selected content item in accordance with some aspects of the present technology;

FIG. 12A and FIG. 12B show example details panes in a window separate from the file system explorer, and show a preview of a location in which a comment is anchored with a content item in accordance with some aspects of the present technology;

FIG. 17A and FIG. 17B show example details panes in a window separate from the file system explorer, the details pane includes a dynamic preview of a content item that can receive edits in the dynamic preview in accordance with some aspects of the present technology;

FIG. 19 shows an example of a system for implementing certain aspects of the present technology.

DETAILED DESCRIPTION

Figure 1:
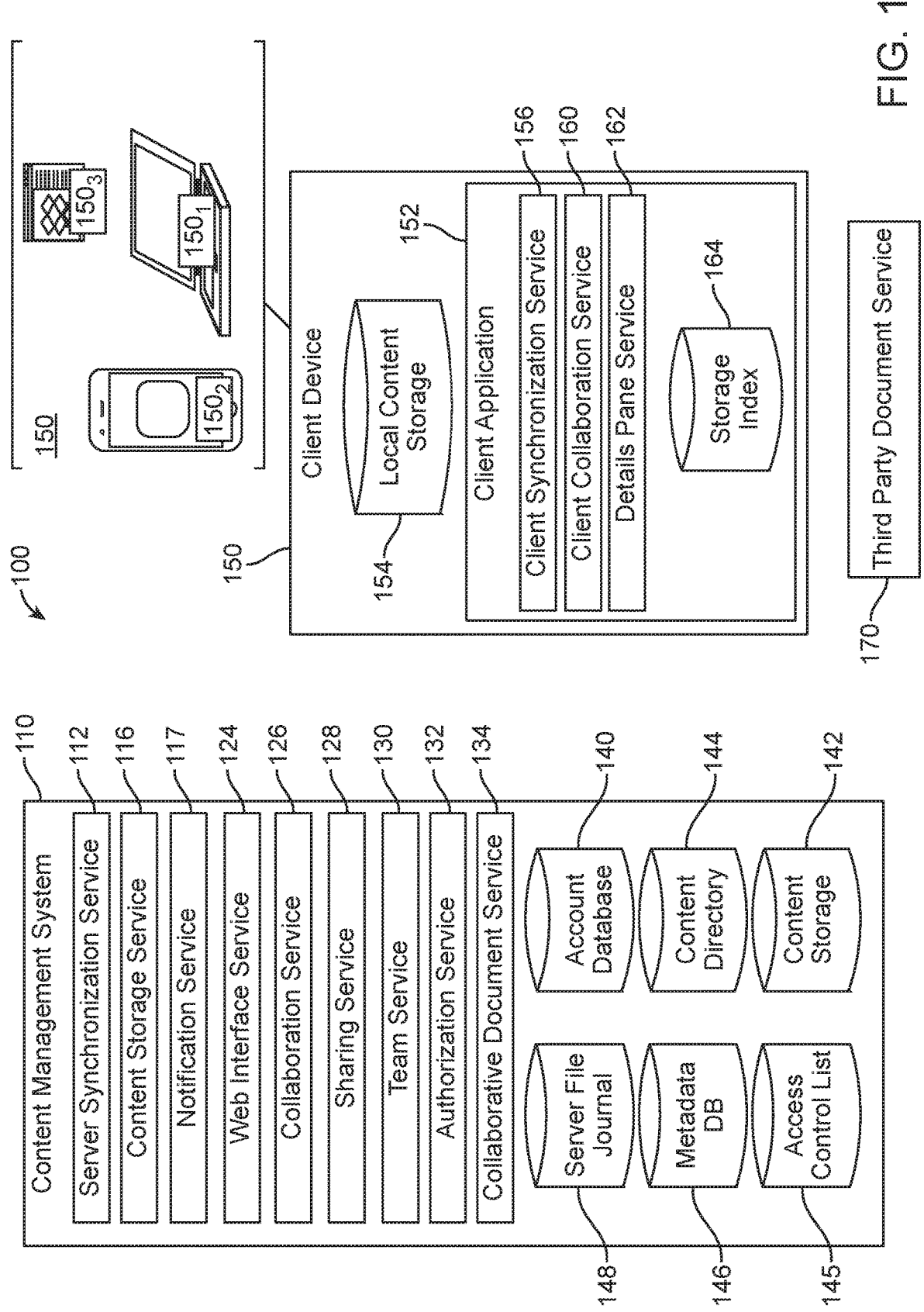
FIG. 1 shows an example of a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a file explorer application that is optimized to account for modern day realities regarding where users store and access files, and regarding how users engage with content items. Additionally, the disclosed technology addresses the need to view types of information that have not been exposed by a file explorer application in the past, but these types of information are important in helping a user identify content items, or content items that might need the user's attention. Identifying content items is more important than ever given the ever-increasing amount of stored data that is accessible to users.

Since many users store content items in content management systems, and cloud hosted document services as well as on local storage of client devices and network accessible drives, an improved file explorer should be able to show information regarding all content items regardless of where stored. In some embodiments, an improved file explorer should be able to display a listing of content items that include content items from different sources at the same time.

Since some sources in which a content item may be stored may include different features, or may store different metadata associated with content items, an improved file explorer should display new types of information available from the various sources.

Since many content items are now shared with other users, or may even be collaborative content items that allow multiple users to edit and comment on a content item, an improved file explorer should present information regarding recent activities pertinent to the content items.

Since some users need to access many files to make minor changes or just to view a minor update or comment made in a content item, a file explorer should provide enhanced previews that make some actions possible from the enhanced preview and without having to fully open the document.

The present technology provides a file explorer that meets one or more of the stated deficiencies of traditional file explorers. By meeting the above stated needs, the present technology not only solves problems associated with displaying more useful information regarding content items from a plurality of diverse sources, but also provides several efficiencies. Since more useful information is in one place, a user does not need to operate a computing device to navigate through many additional screens to be exposed to all the data that the present technology can present in a file explorer. Further, since some actions can be performed without fully opening a content item, and without opening default applications utilized in opening content items, these actions can also save computing resources. Furthermore, the user themselves is also made more efficient since finding a relevant file, learning relevant information, and performing some tasks can all be performed in the file explorer.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system 110, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on local content storage 154 of client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service 116 can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system in local content storage 154 accessible by multiple applications resident thereon, or client $150_2$ might access content management system 110 via a web browser. As such, the form factor should not be considered limiting when considering client device 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments where synchronization is from client device 150 to content management system 110, a user can manipulate content items directly from the file system of client device 150, while client synchronization service 156 can monitor a directory on client device 150 for changes to files within the monitored folders.

When client synchronization service 156 detects a write, move, copy, or delete of content in a directory that it monitors, client synchronization service 156 can synchronize the changes to content storage service 116. In some embodiments, client synchronization service 156 can perform some functions of content storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request for changes listed in server file journal 148 since the last synchronization point known to the client device is made. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
FIG. 2 shows an example file system explorer including a details pane showing activity metadata for a root folder in accordance with some aspects of the present technology.

FIG. 2 illustrates file browser interface 200 of client application 152 in accordance with some aspects of the present technology. File browser interface 200 includes content items listing section 204 and details pane 202. In some embodiments, file browser interface 200 can be presented by an application stored and executing on client device 150 that has access to local content storage 154 and services and databases of content management system 110. In some embodiments, file browser interface 200 can be presented by a web browser that interprets code downloaded from content management system 110 or stored on client device 150 to render the features of file browser interfaces such as content items listing section 204 and details pane 202, among other features described herein. Regardless of the source of the code interpreted by a web browser rendering file browser interface 200, file browser interface 200 has access to local content storage 154 and services and databases of content management system 110 in accordance with the features described herein.

Details pane 202 can be populated and maintained by details pane service 162. As described further herein details pane service 162 is responsible for requesting and populating data to be displayed in details pane 202. In some embodiments, details pane service 162 may also be responsible for displaying details pane 202 in combination with the client application 152 or web browser on client device 150.

Content items listing section 204 is configured to list all content items contained within a grouping regardless of the storage location of those content items. For example, as illustrated in FIG. 2, content items listing section 204 shows all content items contained within grouping 205 "Dropbox." As is known in the art, Dropbox is a content management service (such as the service managed by content management system 110 described herein) that stores content items in cloud storage, and, for many types of files, can maintain synchronized copies of the content items stored in the cloud with copies stored in local storage on a client device. However Dropbox also can maintain content items stored only in the cloud. Content items listing section 204 can display representations of all content items stored by content management system 110 including both content items stored in local content storage 154 of client device 150 and content items stored in content storage 142 of content management system 110. Representations of content items having copies stored in both local content storage 154 and content storage 142 can be used to open such content items directly from local content storage 154.

A grouping such as grouping 205 does not need to be limited to a single source. For example, a grouping could be linked to multiple different sources such as different content management system services (e.g., Dropbox, Box, SugarSync, iCloud, OneDrive, etc.), different online document editing services (e.g., Google Docs, Dropbox Paper, Microsoft Office Online, iCloud, etc.), and local content storage 154. In some embodiments, such as illustrated in FIG. 1, file browser interface 200 and details pane 202 are part of client application 152 associated with content management system 110. In such embodiments, content management system 110 would be a primary service, and any other service, such as any of the representative services listed above, would be considered a secondary service 170. In some embodiments, a secondary service can be provided by a third party service—e.g., a service that is not the provider of file browser interface 200 and details pane 202.

Details pane 202 is configured to display information such as comments, activity, previews, etc. pertaining to content items shown in content items listing section 204.

FIG. 2 illustrates an embodiment of details pane 202 when no specific content item has been selected in content items listing section 204. The information displayed in details pane 202 when no specific content item has been selected pertains to any of or multiple of the content items displayed in content items listing section 204. The information displayed in details pane 202 can be sourced from any service storing one of the content items represented in content items listing section 204. Thus, the information displayed in details pane 202 can come from multiple sources.

FIG. 2 illustrates an activity section 206 shown in details pane 202. Activity section 206 lists information pertaining to activity occurring with respect to content items in content item listing section 204. Activity occurring with respect to a content item can include information that a content item was opened, edited, shared, commented on, etc. In some embodiments, the activities occurring with respect to a particular content item may be aggregated, as will be described further herein. Activities in the activity section can be sent to client application 152 by notification service 117.

In some embodiments, content items listed in content item listing section 204 are shared content items 209 and file browser interface 200 can display icons representing user accounts 208 to which content items in a grouping are shared. In some embodiments, icons representing user accounts 208 reflect user accounts currently viewing the content item or that have previously viewed the content item. In some embodiments, icons representing user accounts 208 can be arranged from most recent viewing of the content item to least recent such that the user account that has most recently viewed the content item is displayed to the left of the icons, and icons representing user accounts with previous views of the content item can be displayed to the right. In some embodiments, only user accounts that have viewed the content item within a particular time period, or since a content item was last revised are displayed in icons representing user accounts 208.

Figure 3:
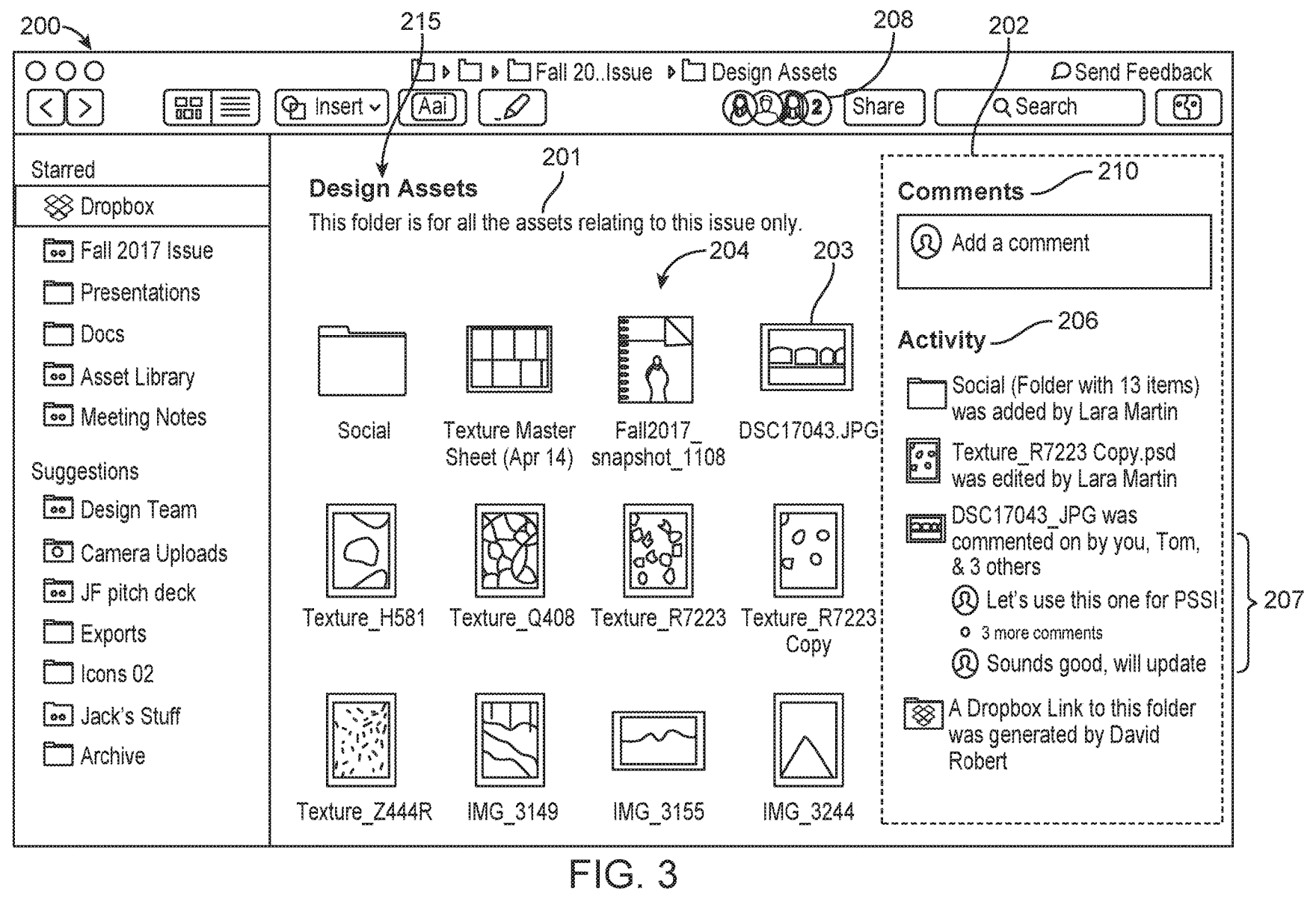

FIG. 3 illustrates another view of file browser interface 200. In FIG. 3, file browser interface 200 displays grouping 215 "design assets" which is a subfolder in a larger collection. As illustrated, the title of grouping 215 is accompanied by brief description 201 of the contents of grouping 215. In some embodiments, brief description 201 can be edited by a user with sufficient privileges for folder 215. Just as in FIG. 2, file browser interface 200 in FIG. 3 also includes content item listing section 204, details pane 202, and icons representing user accounts 208. FIG. 3 illustrates details pane 202 including comments section 210 along with activity section 206. Comments section 210 reflects that no comments have been provided for subfolder "design assets" 215, but as reflected in activity section 206 at least one content item within the subfolder "design assets" 215 has received comments (e.g., activity 207 reflects that comments have been made regarding content item 203). The other activities listed in activity section 206 reflect added, edited, or shared content items within the subfolder "design assets" 215. Comments section 210 can be presented in any details pane view. In some embodiments, comments section 210 can display comments for an entire collection of content items displayed in content items listing section 204 (such as illustrated in FIG. 3), or can display comments for a specific, selected content item (such as illustrated in FIG. 4).

Figure 9:
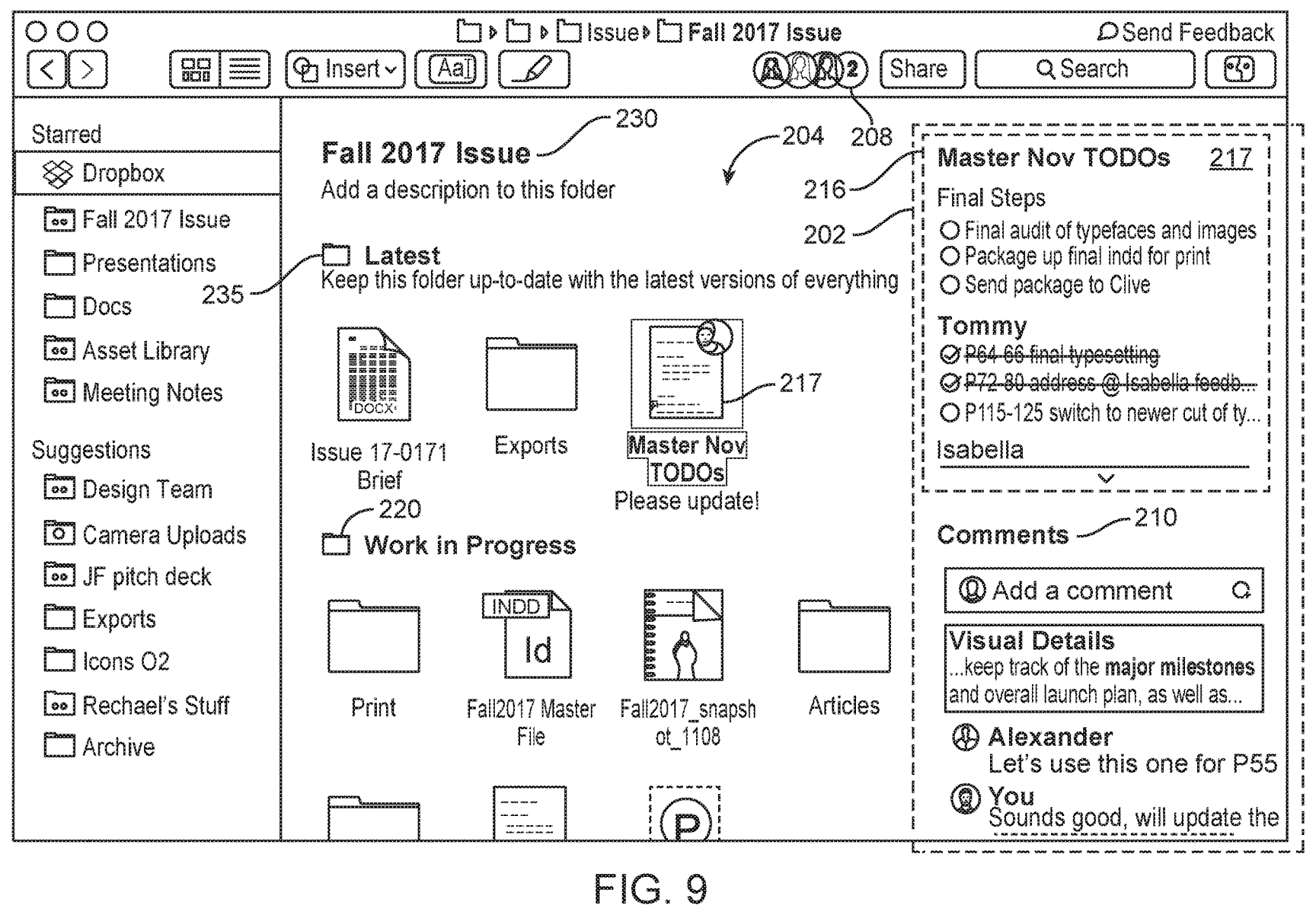

Comment section 210 is configured to display comments pertaining to any content items listed in content item listing section 204. In some embodiments, comments section 210 can also include replies to a previous comment and can form a conversation thread. Comment section 210 also includes an interface to receive a comment. In some embodiments, the comment can pertain generally to grouping 215. In some embodiments, the comment can be in reply to a previous comment, and thereby create a conversation thread of linked comments (as illustrated in FIG. 9 and FIG. 15A). Comments can be sent to client application 152 by notification service 117.

Figure 4:
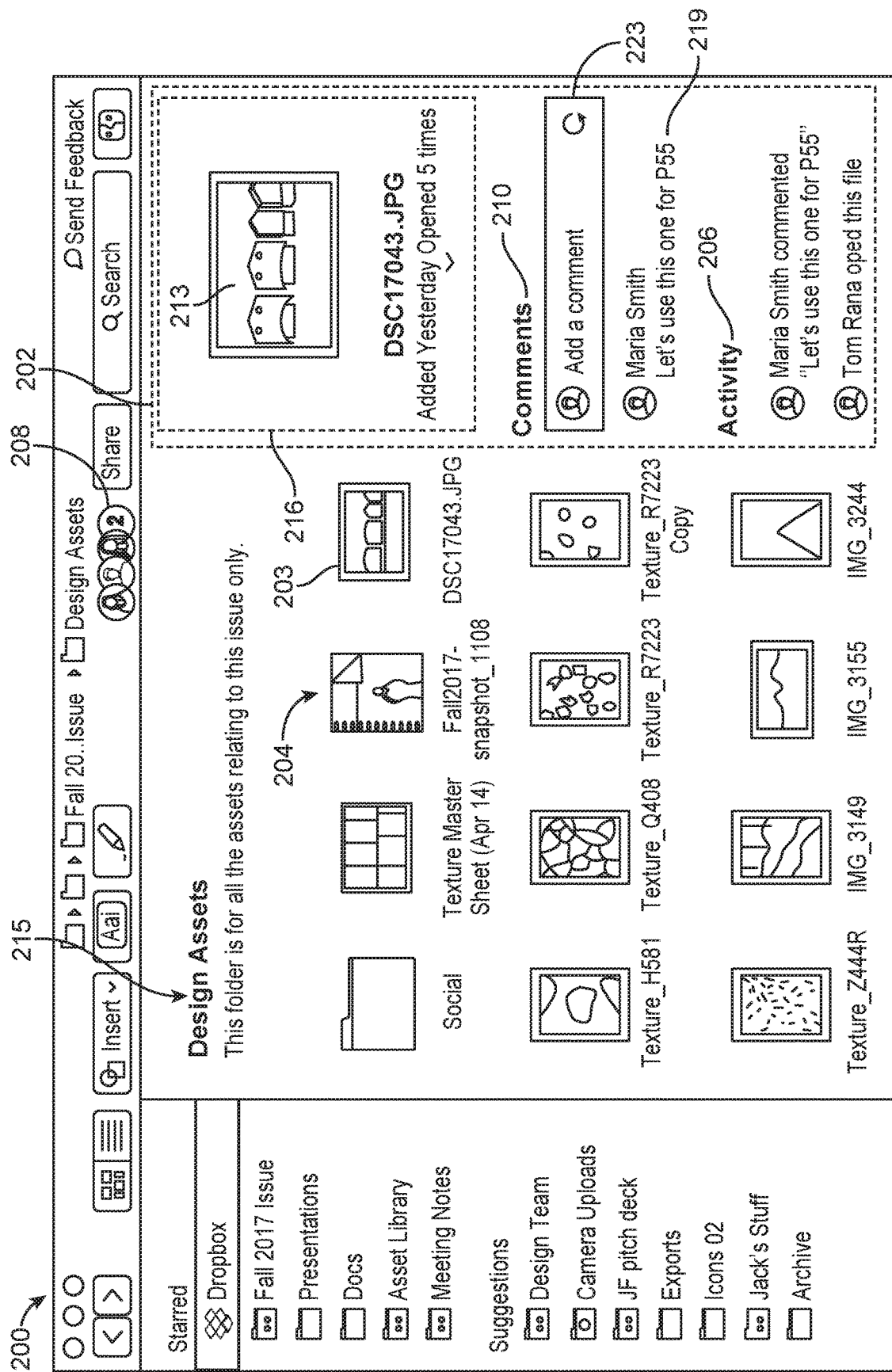
FIG. 4 shows an example file system explorer including a details pane showing activity metadata, comments, and a preview for a selected content item in accordance with some aspects of the present technology.

In some embodiments, such as illustrated in FIG. 4, when a particular content item is selected in content items view 204, details pane 202 can display details (e.g., activities, comments, previews, etc.) that are specific to the selected content item. FIG. 4 illustrates another view of file browser interface 200, which again illustrates grouping 215. However, in FIG. 4, a particular content item, content item 203, is selected causing details pane 202 to only reflect information relevant to the selected content item 203. Details pane 202 now includes preview section 216 showing preview 213 of the selected content item 203. Comments section 210 illustrates comment 219 given on the selected content item 203 and provides an interface 223 to provide new comments regarding the selected content item. Activity section 206 shows only activity pertinent to the selected content item.

Figure 5A:
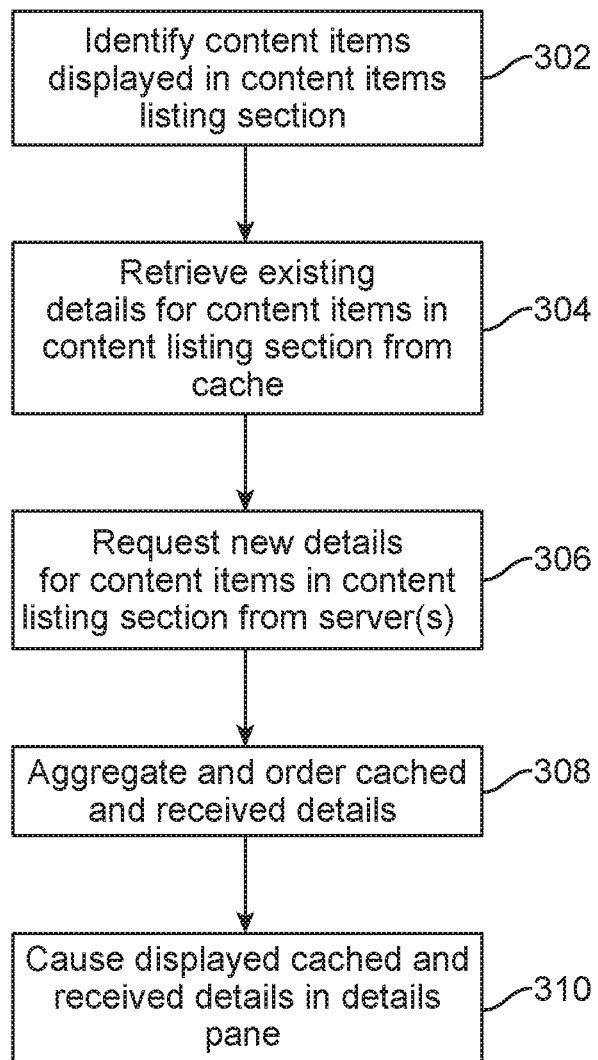
FIG. 5A shows an example method embodiment for populating details pane with details in accordance with some aspects of the present technology.

FIG. 5A illustrates an example method for populating details pane 202 with information relevant to content items displayed in content item listing section 204. A file browser application can include a content items listing section 204 showing content items locally stored on client device 150 in local content storage and/or showing content items stored in an online service such as content management system 110 or secondary service 170. The file browser application also includes details pane 202 that is populated with data by details pane service 162. Details pane service 162 is responsible for populating details pane 202 with information relevant to content items in content items listing section 204, and is responsible for reacting to inputs received within details pane 202.

Details pane service 162 can identify (302) content items displayed in content item listing section 204 (or all content items in a directory that is open in the file browser application) and can retrieve (304) existing details for content items in content item listing section 204 from a cache on client device 150. In some embodiments, the cache can be part of storage index 164. The cache is a collection of previously received information regarding content items previously displayed or that may be displayed in file browser interface 200. In some embodiments, the cache may be populated when details pane service 162 requests information regarding a content item from one or more sources. In some embodiments, the cache may be populated when notification service 117 sends notifications regarding a content item to client application 152.

As introduced above, notification service 117 can receive information regarding details for a content item and notify client devices 150. In some embodiments, notification service 117 is configured to receive raw event data and translate the raw event data into details that are more meaningful to users, or to aggregate the details to provide a better user experience. As addressed herein, notification service 117 can collect information regarding any file level event regarding a content item. Notification service 117 can also access information regarding actions taken by collaborators with whom a content item is shared with respect to the content item. Notification service 117 can also access information regarding comments made with respect to a content item, information regarding timestamps pertaining to when a content item was last opened, created, modified, etc. In addition to accessing this information, notification service 117 can also translate notifications, and/or aggregate notifications pertaining to a content item or a collection of content items to provide more meaning or a better user experience to users. For example, a poor user experience might result from sending too many notifications to client devices 150, such as might happen if a collection of content items was newly shared. In such an example, and in some implementations, notifications could be sent regarding every content item in the collection, which may result in many notifications. In other examples, notification service 117 can send a single notification regarding the collection that was shared, or send a notification stating that many content items had been shared. While notifications service 117 can aggregate notifications prior to sending the notifications to client device 150, in some embodiments, details pane service 162 can request raw data (not aggregated) for storage in cache so that details pane service 162 can make its own aggregation decisions based on the raw data.

In addition to retrieving (304) details from the cache, details pane service 162 can request new details (306) for content items in content item listing section 204. These details may be for activities, and comments that have occurred after the last recorded activity details stored in the cache.

As noted above, while notification service 117 can perform an aggregating function. In some embodiments, details pane service 162 can additionally aggregate (308) details by further combining details stored in cache, and/or details received in response to request (306) for new details. Notifications service 117 only aggregates notifications including details at the time the notifications are sent to client device 150, but details pane service 162 can aggregate all details received within a particular time period regardless of whether they were received in a single notification or multiple notifications received at different times.

For example details pane service 162 can aggregate details received within a period of time, e.g., the last week, last three days, today, etc. The details to be aggregated might be stored in cache or received from content management system 110 in response to a request. The details may already be in partially aggregated form. For example, the details might be in the form of two previously received notifications where the first notification from a first time says that "you added 5 items" and a second notification from a second time says that "you added 2 items." These partially aggregated notifications can be fully aggregated by details pane service 162 into a detail that says "You added 7 items."

Figure 6A:
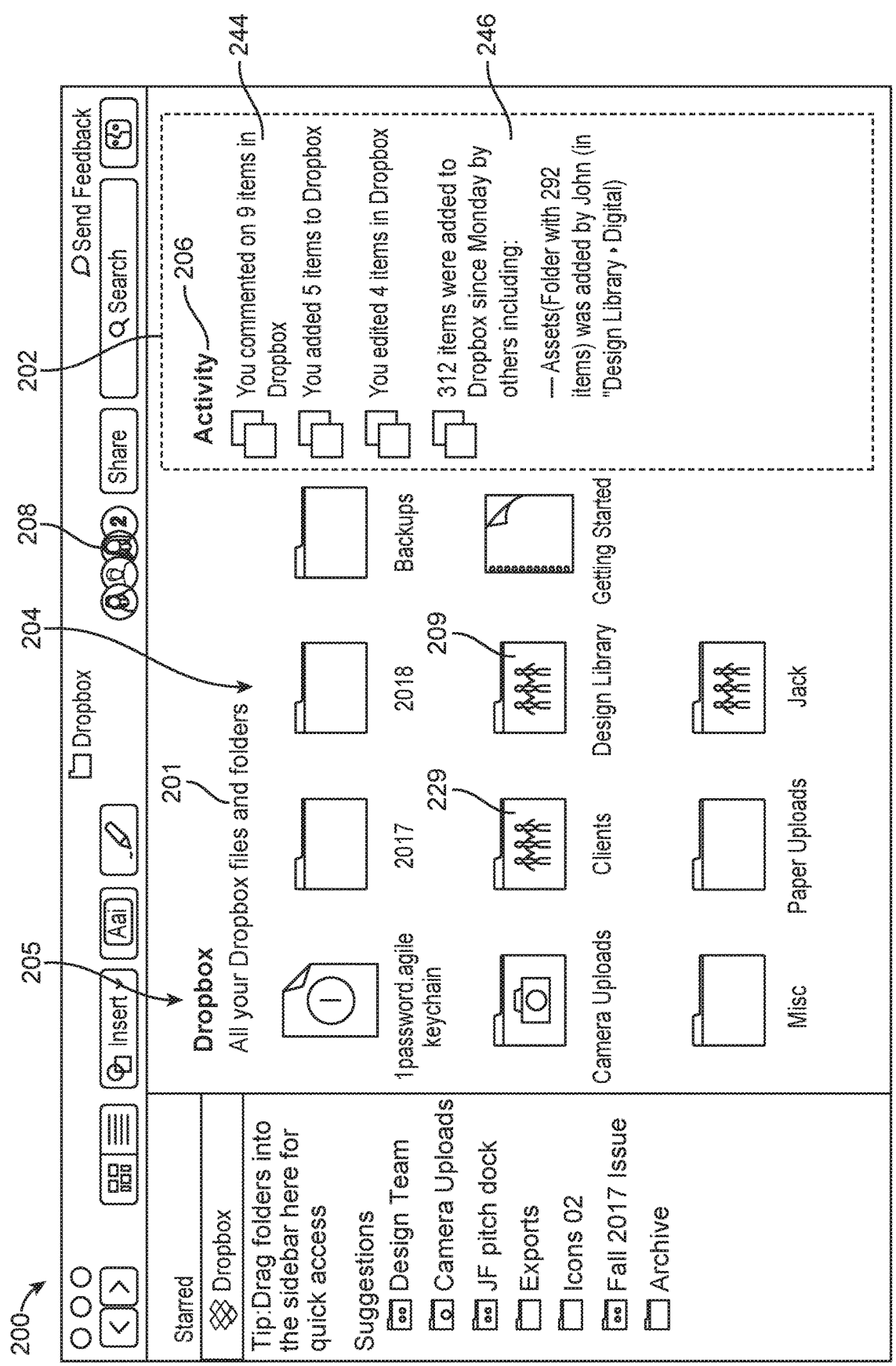
FIG. 6A, FIG. 6B, and FIG. 6C show an example file system explorer including a details pane showing aggregated details in accordance with some aspects of the present technology.

Details pane service 162 can aggregate details based on any common criteria. For example, details can be aggregated based on an actor, i.e., the person performing an action. Such a detail would be "You commented on 9 items in Dropbox" 244 (FIG. 6A). Details can be aggregated based on a common folder or content item—such as "Assets (Folder with 292 items was added . . . " 246 (FIG. 2), or "DCS17043_JPG was commented on by you, Tom, & 3 others" 207 (FIG. 3). Details can be aggregated by time—such as "312 items were added to Dropbox since Monday . . . " 246 (FIG. 6A).

Details pane service 162 can perform several types of aggregation. A first type of aggregation is a true aggregation where details all pertaining to the same criteria can be grouped together. An example of true aggregation is "You commented on 9 items in Dropbox" 244 (FIG. 6A), where the number of files "you commented on" have been summed. A second type of aggregation is debouncing where the same or similar action has been performed repetitively. For example, when a user has made multiple edits and saves to the same content item, the detail can be listed as a single activity detail such as "Weekly To-do List . . . was edited by you" 248 (FIG. 2). The user ("you") may have made several edits, but the activity detail just states that the file was edited. A third type of aggregation is reclassification where raw events pertaining to a content item do not reflect a user's impression of the action. A common type of reclassification pertains to a delete of a content item, closely followed by an add of a content item. Given the sequence of delete then add of the same content item, and that the two events happened close in time, it is highly likely that the user moved the content item. Therefore, in reclassification, details pane service 162 can reclassify delete then add events to be move events.

In some embodiments, details pane service 162 can also choose an order (308) in which to display (310) details in details pane 202. Details pane service 162 can order the details for display according to a relevance function. For example, activities or comments can be ordered based on any one or more factors such as when the detail including the activity or comment was received, when the content item was last interacted with (viewed, edited, commented on, etc.), volume of activity or comments for the content item, number of collaborators, explicit user input indicating interest in a content item, etc.

After details pane service 162 has aggregated and ordered (308) cached and received details, details pane service 162 can cause display (310) of the details in details pane 202.

Figure 5B:
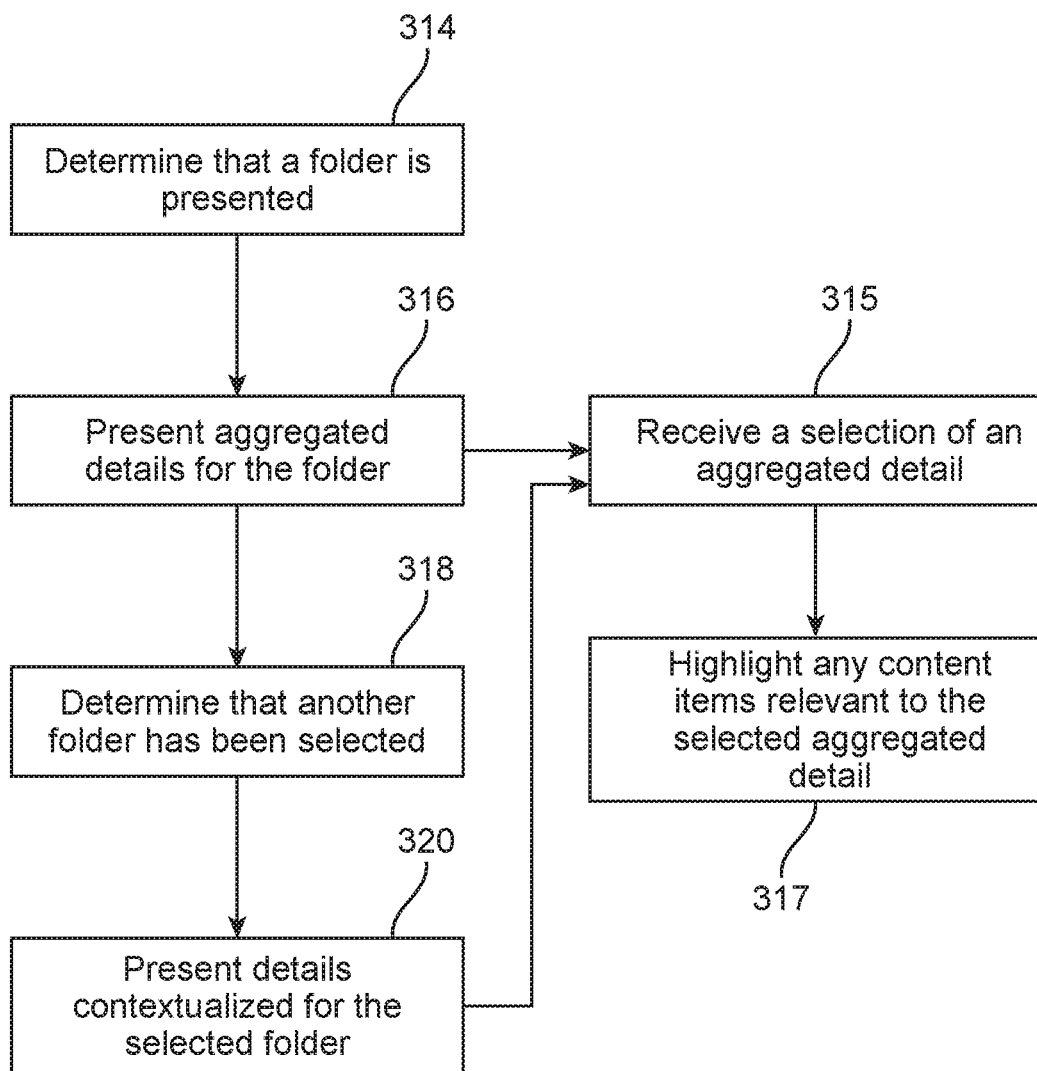
FIG. 5B shows an example method embodiment for presenting aggregated details, and contextualizing aggregated details to a selected folder in accordance with some aspects of the present technology.

In some embodiments, details pertaining to the same event can be aggregated based on a context of a folder that is selected. For example FIG. 5B illustrates an example method for presenting activity details according to the relevant context of the folder that is selected. The method begins when details pane service 162 determines that a folder is presented (314), and presents (316) aggregated details for content items in the presented folder and subfolders (as described in steps 304, 306, 308, and 310 of FIG. 5A).

For example, FIG. 6A illustrates an embodiment showing a root folder 205 in file browser interface 200. Details pane service 162 has populated details pane 202 with aggregated details including details 244 and 246 to accompany the content items displayed in content items section 204. (While FIG. 6A only shows aggregated details in details pane 202, this is to provide a simplified example only, and it should be appreciated that details pane 202 can include non-aggregated details, such as details specific to a particular event on a particular content item.) Since FIG. 6A illustrates file browser interface 200 showing root folder 205, details pane 202 includes aggregated details that pertain to the entire directory. The details can be grouped according to any common characteristic. For example, aggregated detail 244 is grouped based on content items that have been commented on by "you," and aggregated detail 246 is grouped based on content items that have been added to root folder 205 (or its subfolders) since Monday.

Figure 6B:
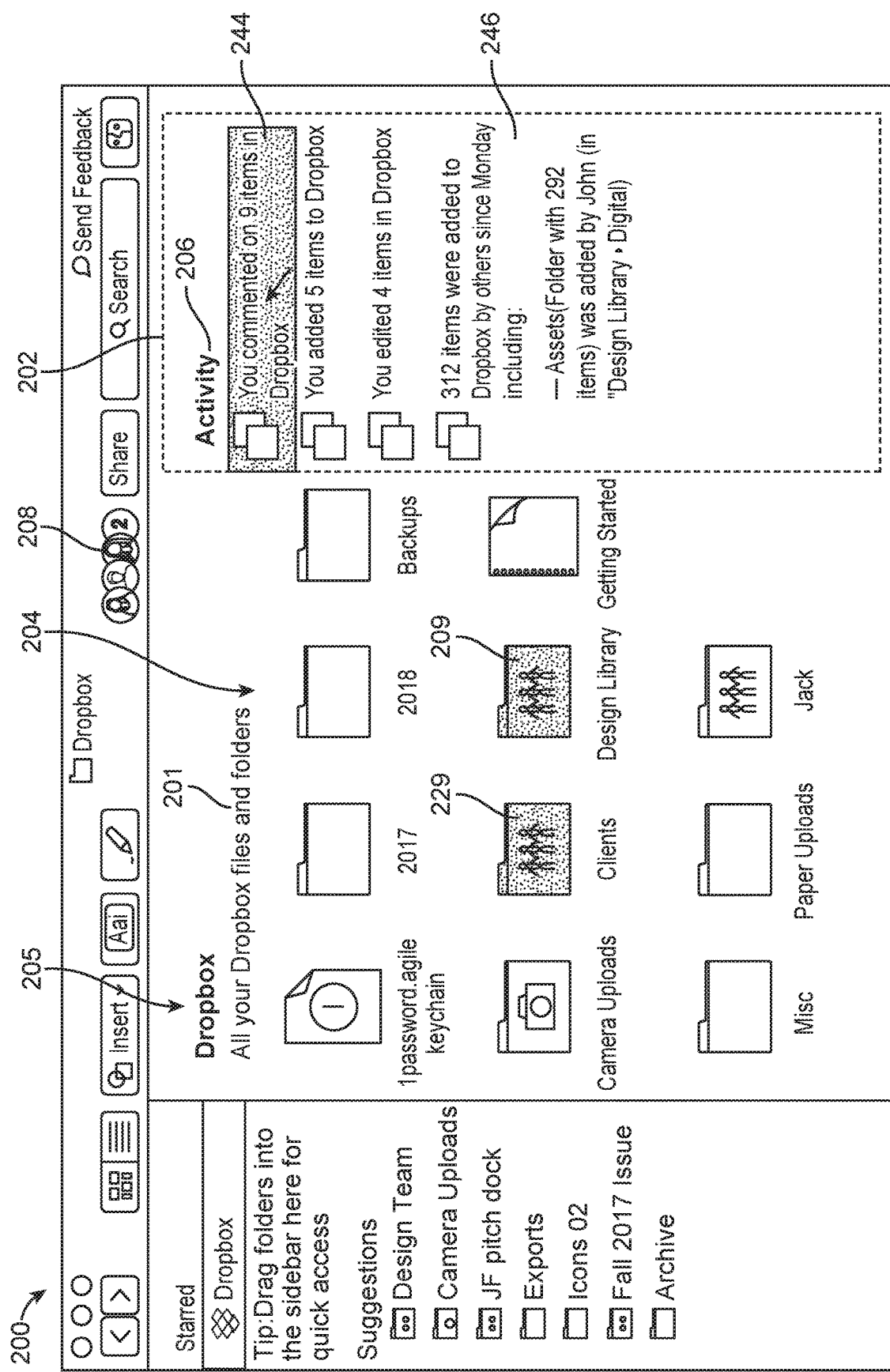

Aggregated details in details pane 202 can be selected. As shown in FIG. 5B, in some embodiments, details pane service 162 can determine that an aggregated detail has been selected (315). After details pane service 162 has determined that an aggregated detail has been selected (315), details pane service 162 can highlight (317) any content items that are relevant to the selected aggregated detail. For example, FIG. 6B shows an example file browser interface 200 showing aggregated detail 244 as having been selected. In accordance with step 315 in FIG. 5B, content items 229 and 209 are highlighted (see FIG. 6B) to reflect that the content items referred to by aggregated detail 244 are located within the highlighted folders. In some embodiments, if a content item that was referred to by aggregated detail 244 was stored directly in root directory 205, the content item itself would also be highlighted.

Figure 6C:
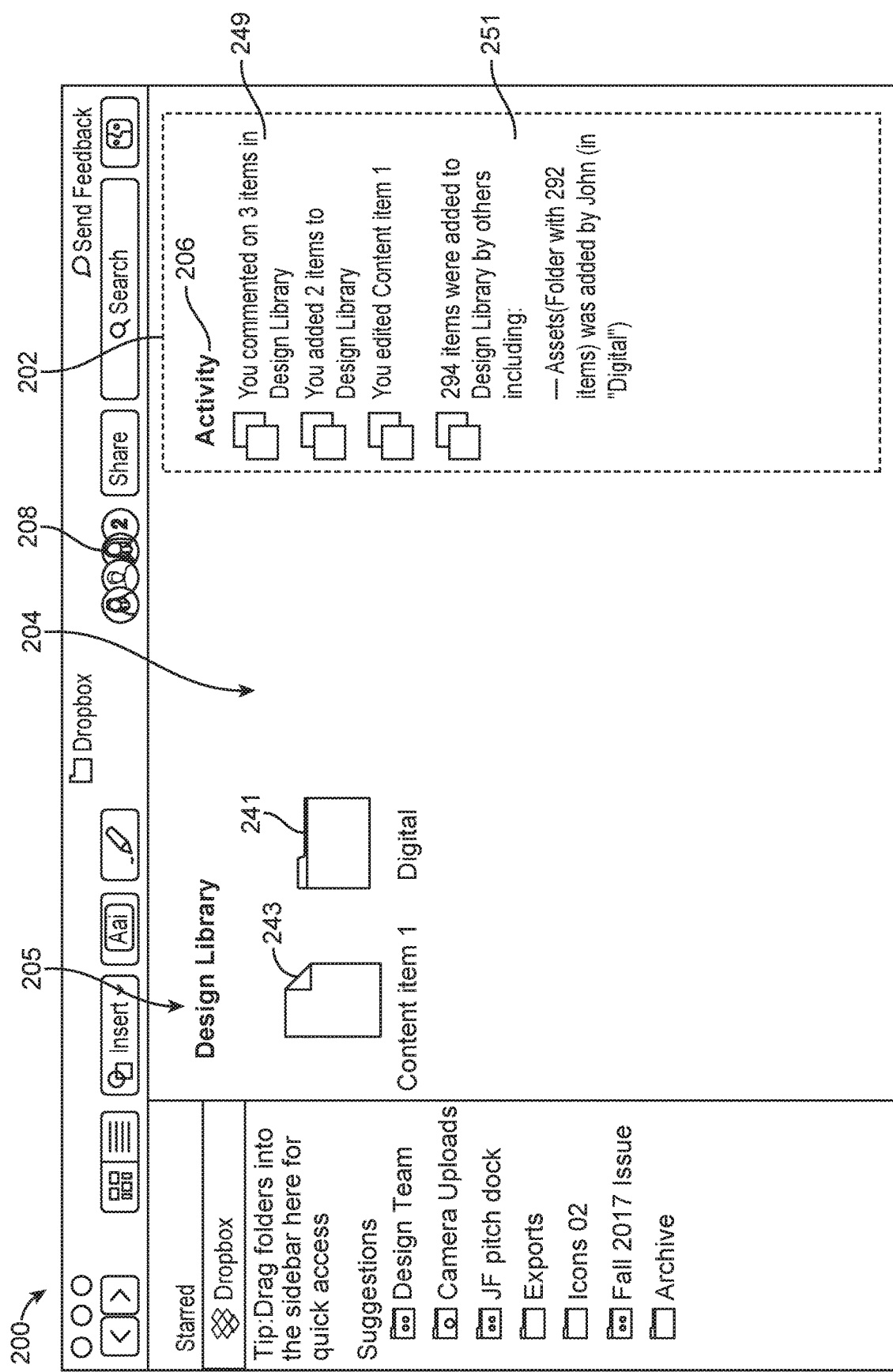

As noted above, aggregated details can be contextualized according to the folder that is presented in file browser interface 200. In FIG. 5B, details pane service 162 can determine (318) that another folder has been selected, and can present (320) details that are contextualized for the selected folder. This contextualization is illustrated by comparing FIG. 6A with FIG. 6C. FIG. 6A presents Dropbox root folder 205, while FIG. 6C presents folder Design Library 209, which is a subfolder of Dropbox root folder 205. Accordingly, FIG. 6A includes aggregated details pertaining to all content items in Dropbox root folder 205, while FIG. 6C includes aggregated details pertaining to content items in Design Library 209 or its subfolders. For example, in FIG. 6A, aggregated details 244 pertains to 9 content items that "you" have commented on, but in FIG. 6C, aggregated detail 249 pertains to only 3 items the "you" have commented on in "Design Library." The context of the aggregated detail that pertains to content items that "you" have commented on has changed from FIG. 6A to FIG. 6C to pertain to only those content items that are in Design Library 209. Specifically, aggregated detail 244 refers to 9 content items, while aggregated detail 249 refers to 3 of those 9 content items. Aggregated detail 249 refers to 3 content items when only two content items are shown (241, 243) because some/all of the 3 content items are located within folder "Digital" 241.

Likewise aggregated detail 251 has been contextualized for presentation of Design Library 209 in FIG. 6C by referring to 294 items (compared to 312 items in aggregated detail 246 in FIG. 6A), and by referring directly to subfolder "Digital" 241 (compared to the path "Design Library->Digital" in aggregated detail 246 in FIG. 6A).

Details pane 202 can determine contextualization of the aggregated details on demand (e.g., after a folder has been selected), or can pre-process the contextualizations by creating and storing contextualizations for each (sub)directory and store this table in cache.

In addition to contextualizing aggregated details according to the folder displayed in file browser interface 200, in some embodiments, details pane service 162 can present different details, alternate groupings of details, and alternate sections for organizing and interacting with details, etc. based on the folder displayed in file browser interface 200. Details pane service 162 can further determine whether content items listing section 204 is displaying a root folder, or a subfolder, or whether a particular content item is selected. When content items listing section 204 is displaying a root folder, details pane service 162 might display only activity details pertaining to content items in the root folder. For example, as seen in FIG. 2, file browser application 200 is displaying root folder 205, and details pane 202 is only displaying activity section 206. While FIG. 2 does not display separate comments section 210 (as seen in FIG. 3) or preview section 216 (as seen in FIG. 4), however, activity section 206 does include comments, and displays thumbnail images next to activities. By displaying less detail sections, details pane 202 can avoid being over crowded.

In some embodiments, details pane service 162 can determine that a directory displayed in content items listing section 204 includes too many content items, and display only certain detail sections (e.g., activities, comments, previews, etc.). As with a determination of a root folder being displayed—by displaying less detail sections, details pane 202 can avoid being over crowded.

In some embodiments, when content items listing section 204 is displaying a subfolder or is displaying less than a threshold number of content items, or there is less than a threshold number of total activities to be displayed, details pane service 162 may display additional types of information. For example, details pane service 162 can display comments section 210 or previews section 216 for content items or collections of content items displayed in content items listing section 204.

Figure 7:
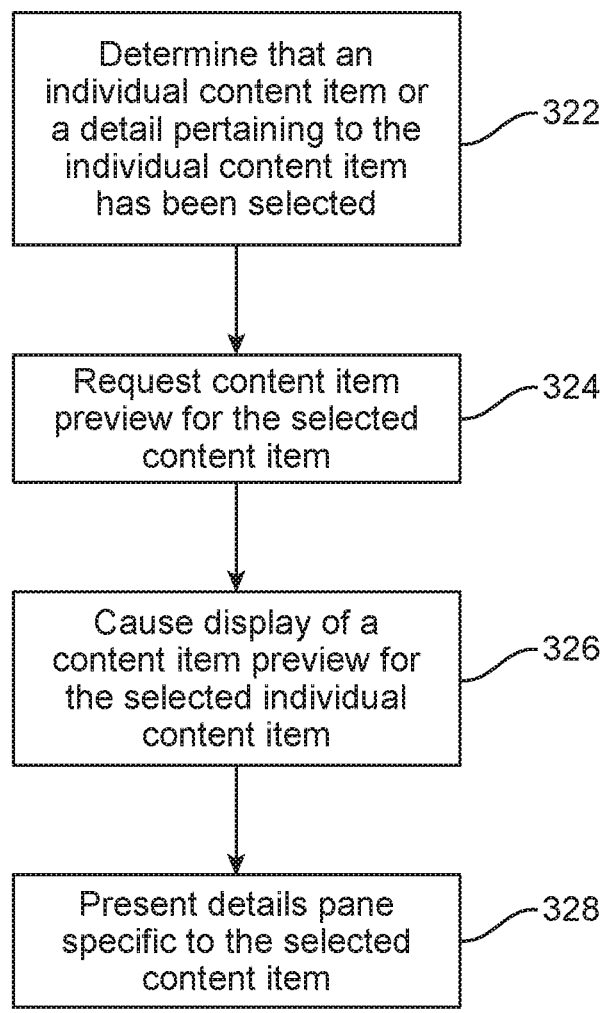
FIG. 7 shows an example method embodiment for providing interactions with the details pane, and for populating details pane with a preview for a selected content item in accordance with some aspects of the present technology.

For example FIG. 7, illustrates an example for receiving a selection of a content items or detail pertaining to the content item, and updating details pane 202 with details specific for the content item. Details pane service 162 can determine (322) that an individual content item within content items listing section 204 or a detail in details section 202 pertaining to the content item has been selected. Both selection of the content item or the detail for the content item can be treated as a selection of the content item. When an individual content item has been selected (such as, e.g., content item 203 in FIG. 4), details pane service 162 can take actions to display a preview of the selected individual content item (such as preview 213 of content item 203) along with comments and activity for the selected individual content item. Thus, details pane service 162 can request (324) a content item preview for the selected individual content item, and display (326) a content item preview in preview section 216 (as seen e.g., in FIG. 4). In some embodiments, the content item preview can be available from a local cache (as explained in step 304 of FIG. 5A); in some embodiments, the preview can be available from content management system 110 (as explained in step 306 of FIG. 5A); and in some embodiments, the preview can be dynamically rendered by details pane service 162 (as explained further with respect to FIG. 10). Additionally, details pane service 162 can present (328) other sections in details pane 202 that are specific to the content item such as comments section 210 and activity section 206, as seen e.g., in FIG. 4 having comment 219 and activities that pertain to selected individual content item 203.

Figure 8:
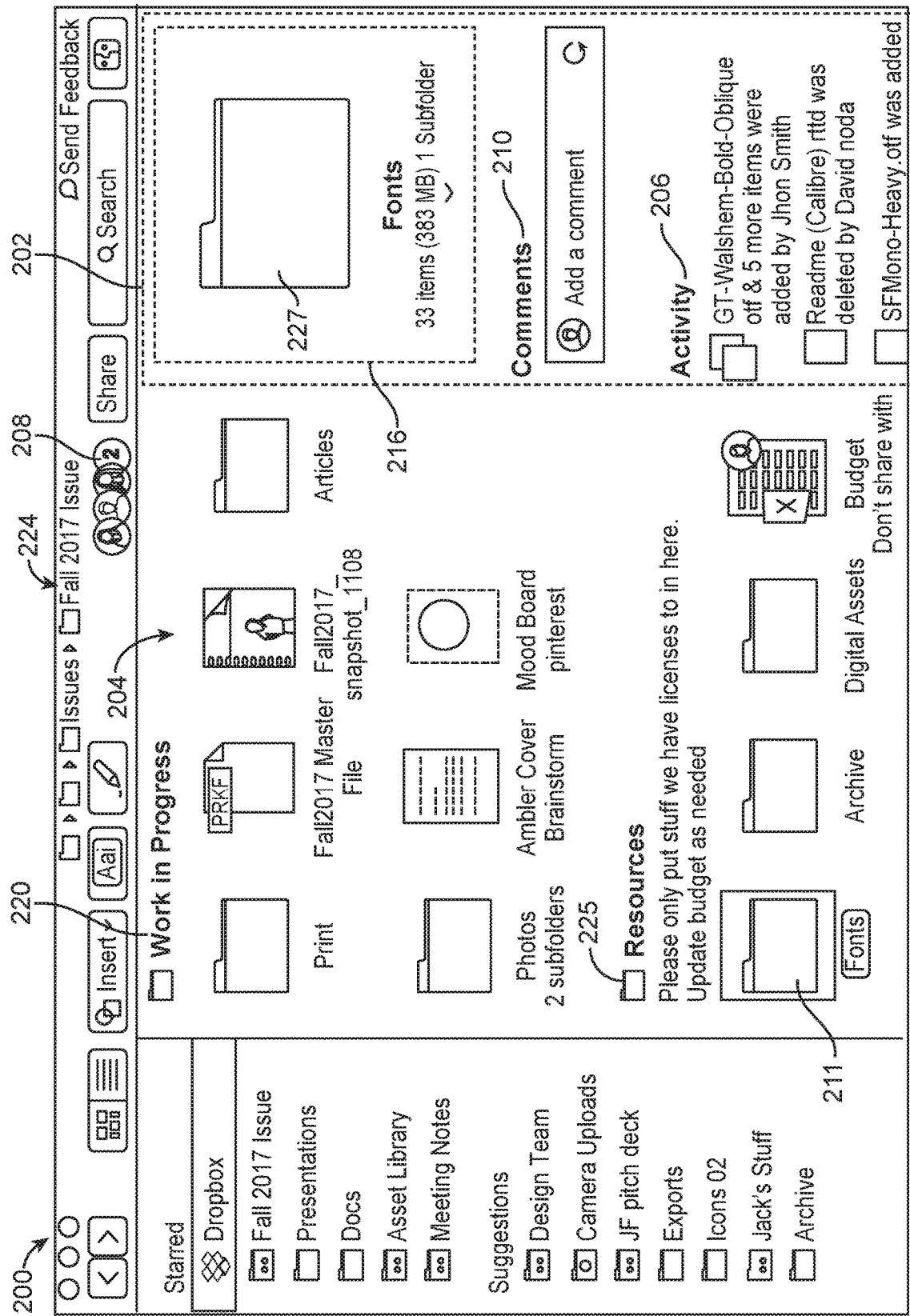
FIG. 8 shows an example file system explorer including a details pane showing activity metadata, comments, and a preview for a selected folder in accordance with some aspects of the present technology.

FIG. 8 illustrates another example of file browser interface 200. In FIG. 8, file browser interface 200 displays the contents of subfolder "fall 2017 issue" as seen in directory path 224. FIG. 8 further shows two additional subfolders within content items listing section 204. The first of those subfolders is subfolder 220 "work in progress," and the second subfolder is subfolder 225 "resources." Within each of subfolder 220 and subfolder 225, additional content items are listed. One such additional content item is folder 211 "fonts," which has been selected. Responsive to the selection of folder 211, details pane service 162 presents details pane 202 showing preview section 216 showing preview 227 of folder 211. Details pane 202 also includes comments section 210 and activity section 206 listing any comments and activity for folder 211.

FIG. 9 illustrates another example of file browser interface 200. In FIG. 9, file browser interface 200 displays the contents of subfolder 230 "fall 2017 issue" and further shows two additional subfolders within content items listing section 204. The first of these subfolders is subfolder 235 "latest," and the second is subfolder 220 "work in progress." In FIG. 9, content item 217 has been selected, and details pane service 162 displays details pane 202 showing preview section 216 showing a preview of content item 217. This preview is a dynamic preview wherein preview section 216 has rendered editable contents of content item 217. For example, as illustrated in FIG. 9, preview section 216 shows a to-do list that can be interacted with directly from details pane 202 without opening content item 217 in a default application typically used to open content item 217. Interactions with content displayed in preview section 216 of details pane 202 will be discussed in further detail with respect to FIG. 11.

Figures 10A, 10B:
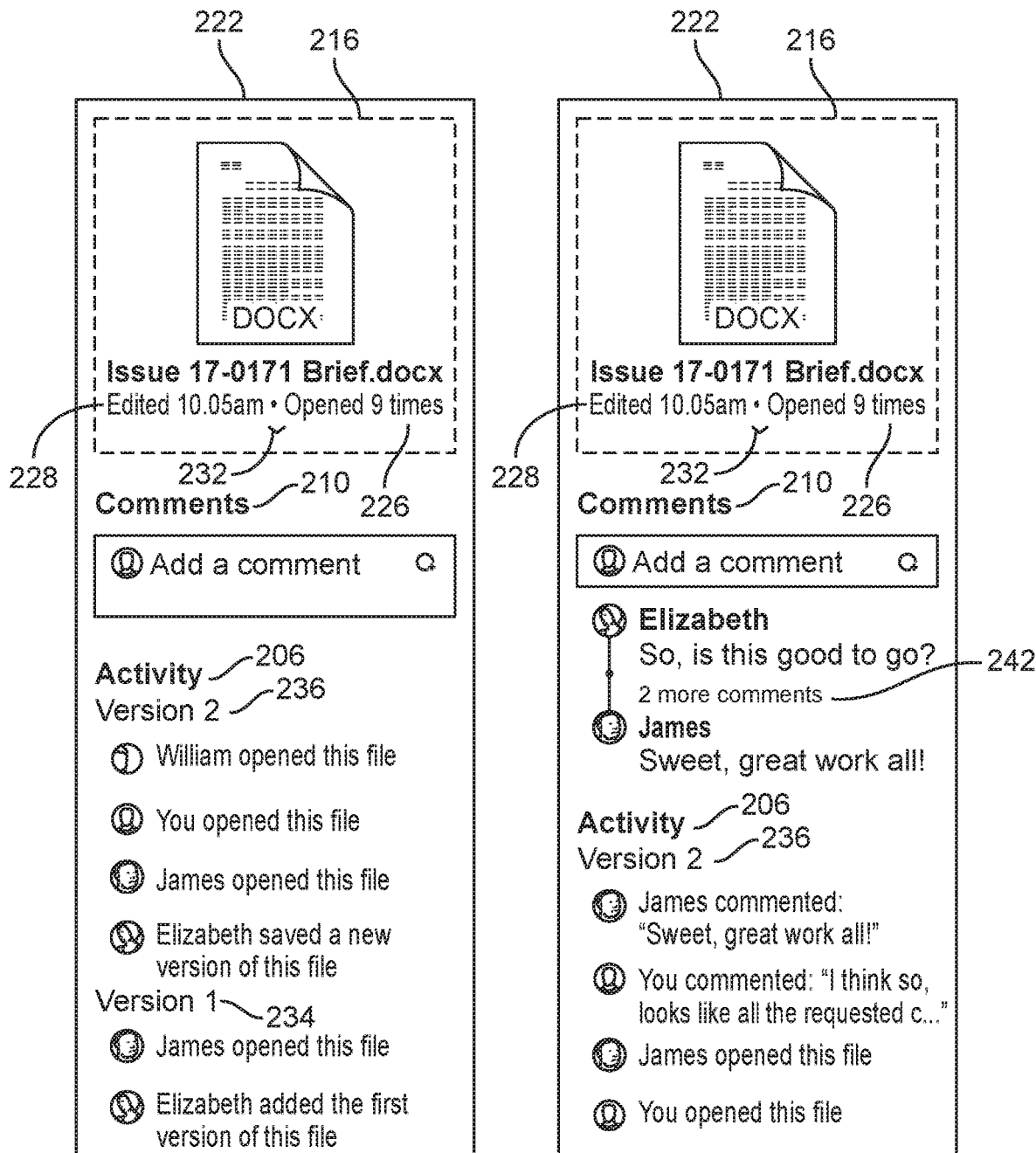
FIG. 10A shows an example details pane in a window separate from the file system explorer in accordance with some aspects of the present technology.
FIG. 10B shows an example details pane in a window separate from the file system explorer in accordance with some aspects of the present technology.

FIG. 10A and FIG. 10B illustrate examples of detached details pane 222. In these embodiments, details pane 222 is displayed as its own separate window as opposed to details pane 202 which is displayed as a portion of file browser interface 200. While detached details pane 222 is displayed as its own separate window, it can function in the same manner as details pane 202 and function in coordination with file browser interface 200. Likewise, any features illustrated in FIG. 10A and FIG. 10B can also be present in any of the attached views of details pane 202 illustrated in other figures.

FIG. 10A illustrates preview section 216 showing a preview of a content item. Preview section 216 also shows metadata associated with the content item. Specifically preview section 216 shows when the content item was last edited 228 next to information regarding the number of times the content item was opened 226. Displaying this information side-by-side is unique and useful. First showing information regarding how recently a content item has been edited 228 is useful but when combined with information regarding how often a file has been opened 226 provides important additional context. Together this information shows not only that a content item is currently relevant but it also shows that it has been repeatedly relevant because it has been opened repeatedly. Also, a high count for the number of times the content item has been opened is an indication that the content item is likely shared. This can be confirmed by viewing activity section 206 that gives more context to who has opened the content item.

One unique aspect of displaying last edited information 228 next to content item open count 226 is that this data may be derived from diverse sources. For example, last edited information 228 may be derived from an operating system of client device 150 while content item open count 226 may be sourced from content management system 110 or other platform that manages shared content items.

Another feature illustrated in FIG. 10A is version information displayed within activity section 206. For example, in some embodiments, activity with respect to a content item can be divided into activity pertaining to different versions of the content item. As illustrated in FIG. 10A activity section 206 displays activity for a first version 234 and activity for a second version 236. In some embodiments, the content item may be associated with a declared input that it should be designated a new version. In some embodiments, the content item may be designated a new version after the content item has been edited and saved.

FIG. 10B also illustrates an example of detached details pane 222. In FIG. 10B, comments section 210 reflects comments on the content item shown in preview section 216. The comments shown in comment section 210 are shown collapsed so that a comment thread does not overtake the entire detached details pane 222, or other comment threads. In some embodiments, when a comments thread is collapsed, details pane service 162 can display a subset of the comments, such as a first and last comment in the comments thread, and can provide information regarding the existence of additional comments 242. In some embodiments, the information regarding the existence of additional comments 242 can be actionable to receive an input and expand to show one or more of the collapsed comments.

Figure 11:
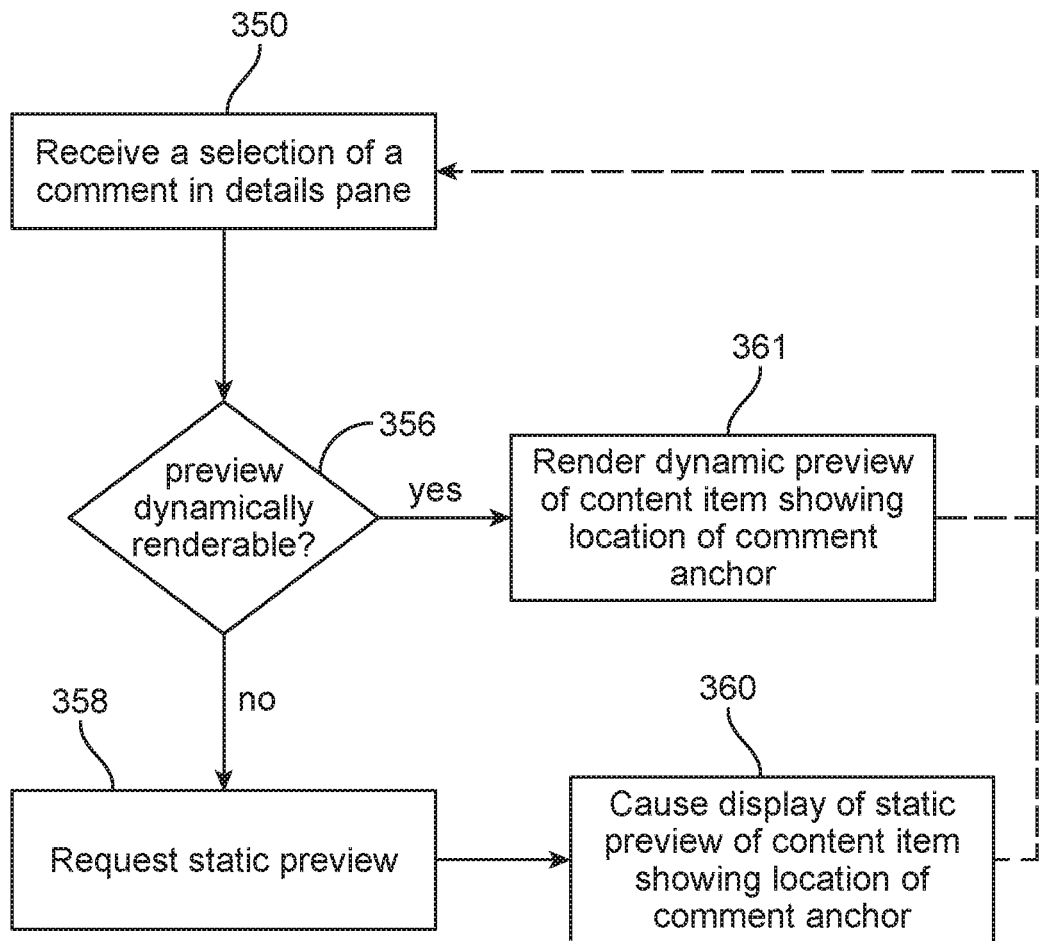
FIG. 11 shows an example method embodiment for presenting a preview or dynamic preview within a details pane in accordance with some aspects of the present technology.
Figure 13:
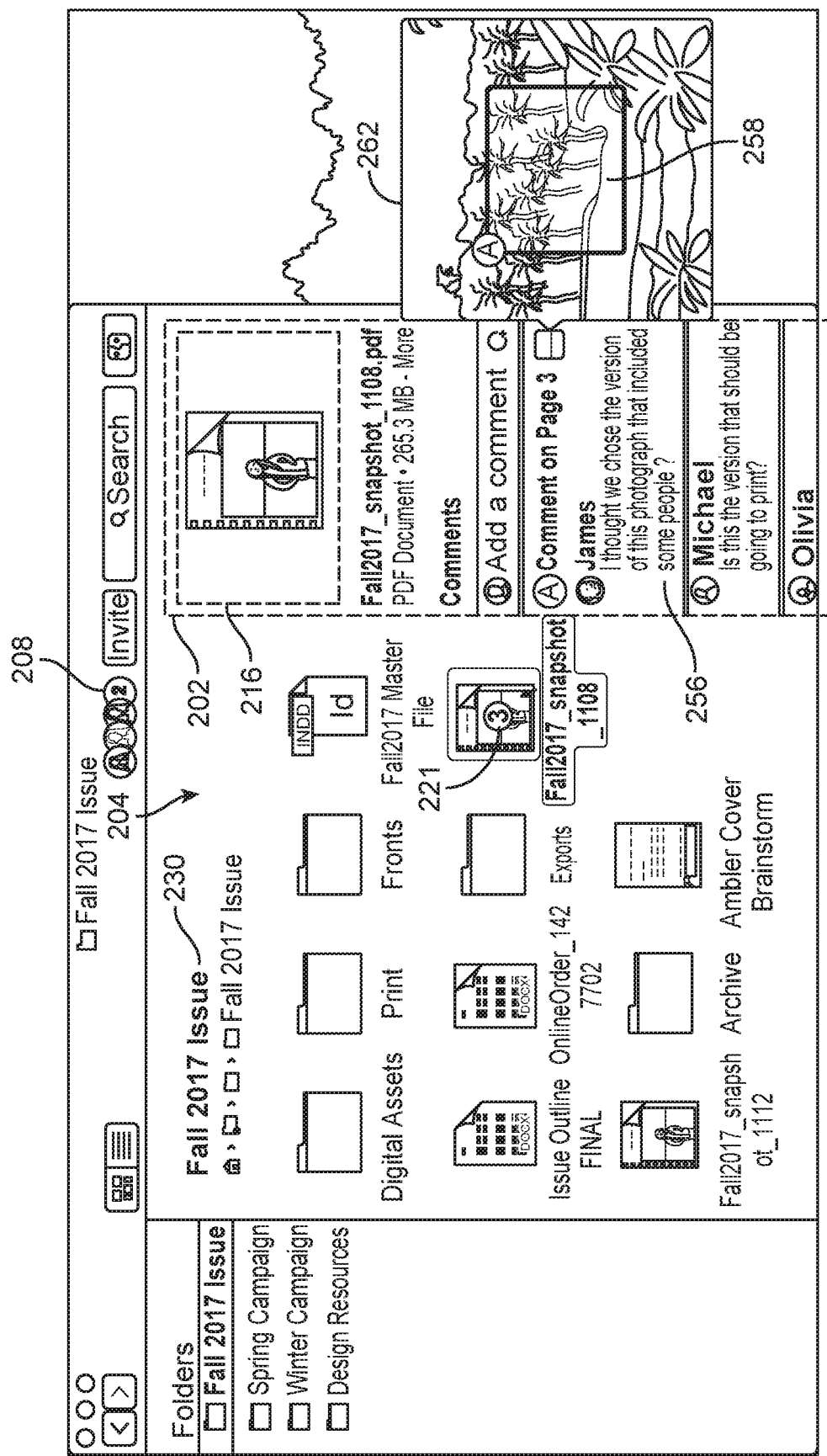
FIG. 13 shows an example details pane and a popout window where the popout window shows a preview of a location in which a selected comment is anchored with a content item in accordance with some aspects of the present technology.

FIG. 11 illustrates an example method pertaining to displaying a preview of a content item by details pane service 162 when file browser interface 200 receives (350) a selection of a comment that is specific to a particular content item. In some embodiments, when details pane 202 is displaying a view including comments section 210, details pane 202 is displaying a view specific to a particular content item, whether that content item is a subfolder or a file. In some embodiments, when details pane 202 is displaying a view that is specific to a particular content item, details pane 202 also includes a preview of the particular content item. A preview can include a preview representing a content item or a preview of a portion of a content item. In some examples, when selection of a specific comment or content item is received (350), details pane service 162 can present a preview showing the location of the comment in the content item. In some embodiments, the preview showing the location to which the comment is anchored within the content item can replace the preview representing the entire content item in preview section 216. In some embodiments, the preview showing the location to which the comment is anchored within the content item can be shown in comments section 210, or in a separate pop out box or window (as illustrated in FIG. 12A, FIG. 12B, and FIG. 13). In some embodiments, a comment anchor can be highlighted text, or a selected point, or a selected area within the content item.

Details pane service 162 can determine (356) whether the content item is of a type that is dynamically renderable as addressed in greater detail below. As such, when details pane service 162 determines (356) that the preview is dynamically renderable, details pane service 162 dynamically renders (361) a preview from a copy of the content item (whether stored locally or in cloud storage) that shows the location of the selected comment in the content item. A dynamic preview can be rendered by a content authoring applet that is part of, or associated with details pane service 162. In some embodiments, the content authoring applet can read contents of content items, locate a comment within the content item, and render the appropriate portion of the content item as the preview. In some embodiments, the content authoring applet can provide a web view through which the content authoring applet can render a preview from a copy of the content item stored at content management system 110. Note, while a local copy of the content item may be available on client device 150, the web view can still render the preview based on content management system copy of the content item.

In some embodiments, a dynamic preview can receive edits directly in the preview. In some embodiments, the dynamic preview can receive and respond to inputs to navigate within the content item.

In some embodiments, details pane service 162 might not be able to render dynamic previews of some content items. When details pane service 162 determines (356) that it is not able to dynamically render a preview, details pane service 162 can request (358) a static preview showing a portion of the content item and display (360) a preview of the content item showing a location within the content item to which the selected comment is anchored. Dynamic previews are further addressed with respect to FIG. 16, below.

The static previews can be received from content management system 110 which can provide a service that opens content items and creates previews of the content item surrounding a selected comment within the content item. In some embodiments, this function can be performed in advance and pre-processed previews can be sent to client device 150 to be cached. In some embodiments, the previews can be created and/or sent to device 150 on demand and at the request of details pane service 162.

In some embodiments, previews showing a comment in a content item might be automatically included in comments section 210.

In some embodiments, while a preview of a content item showing the location of a comment within the content item is being displayed, details pane service 162 can receive an input selecting (350) another comment resulting in presentation of another preview (360, 361) showing the location of the another comment within the content item.

FIG. 12A and FIG. 12B illustrate two examples of details pane 222 illustrating example previews showing the location of comments within a content item. While FIG. 12A and FIG. 12B illustrate detached details pane 222, it should be appreciated that all of the features illustrated therein apply equally to the details pane in other form factors such as details pane 202.

As illustrated in FIG. 12A and FIG. 12B, detached details pane 222 includes preview section 216 showing a general preview applicable to content item 217. Comments section 210 presents a preview showing the location of a comment with respect to content item 217.

FIG. 12A and FIG. 12B also illustrate an expandable preview section 216. User interface control 232 can be activated to expand preview section 216 as shown in FIG. 12A to reveal metadata regarding content item 217. When preview section 216 is expanded, user interface control 232 can be selected to collapse preview section 216 to hide the additional metadata details.

FIG. 13 illustrates file browser interface 200 including details pane 202 showing details pertaining to content item 221. Preview pane 216 displays a preview of content item 221, and comments section 210 shows comments pertaining to content item 221. In FIG. 13, an individual comment, comment 256, has been selected, and in response, details pane service 162 has displayed popout window 262 to display a preview of the portion 258 of content item 221 to which comment 256 is anchored.

Figure 14:
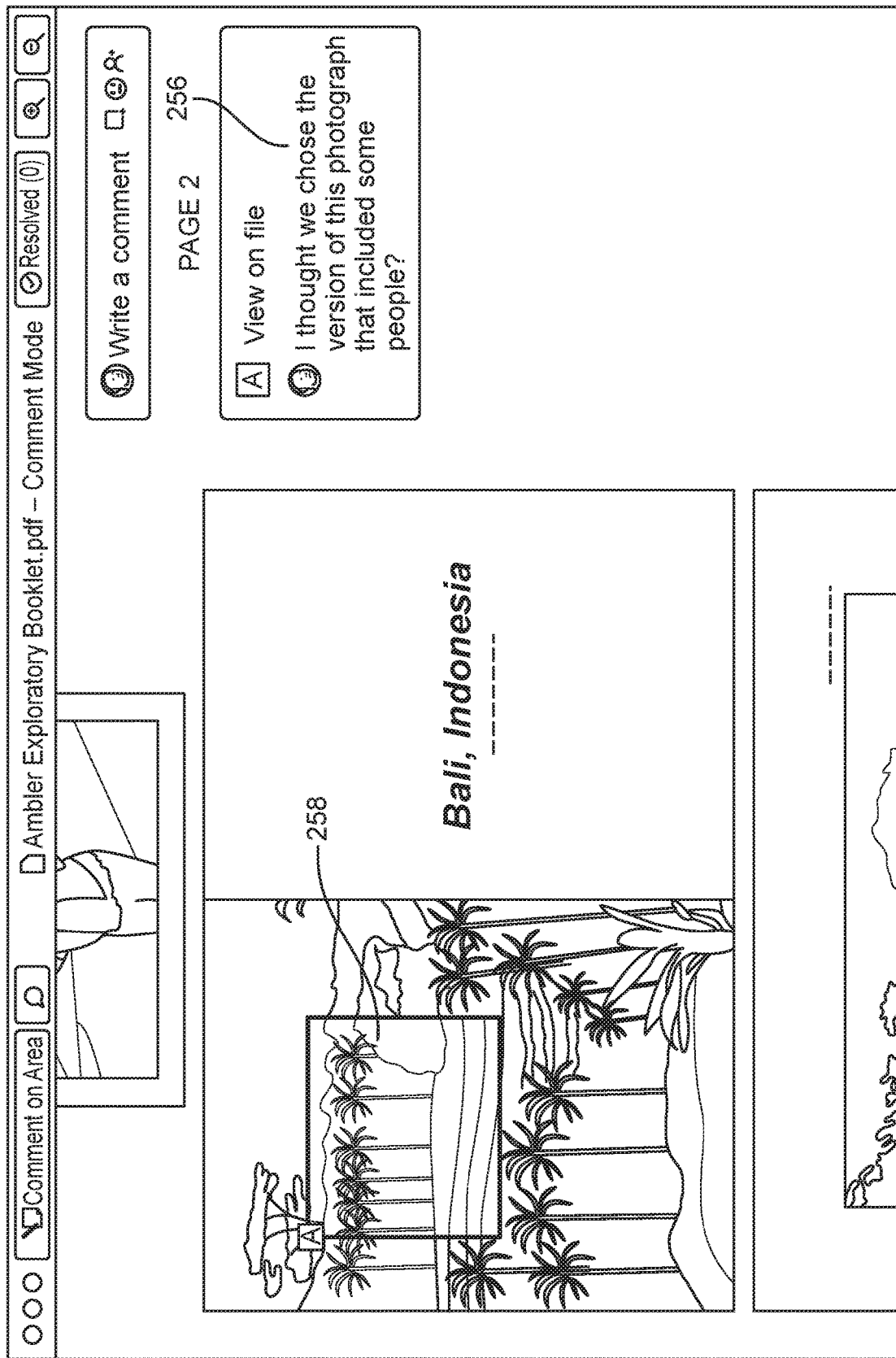
FIG. 14 shows an example document with a comment placed within it in accordance with some aspects of the present technology.

FIG. 14 illustrates an example of content item 221 opened in a native or default application. As shown in FIG. 13, comment 256 is shown along with the portion 258 of the document to which it is anchored.

Figure 15:
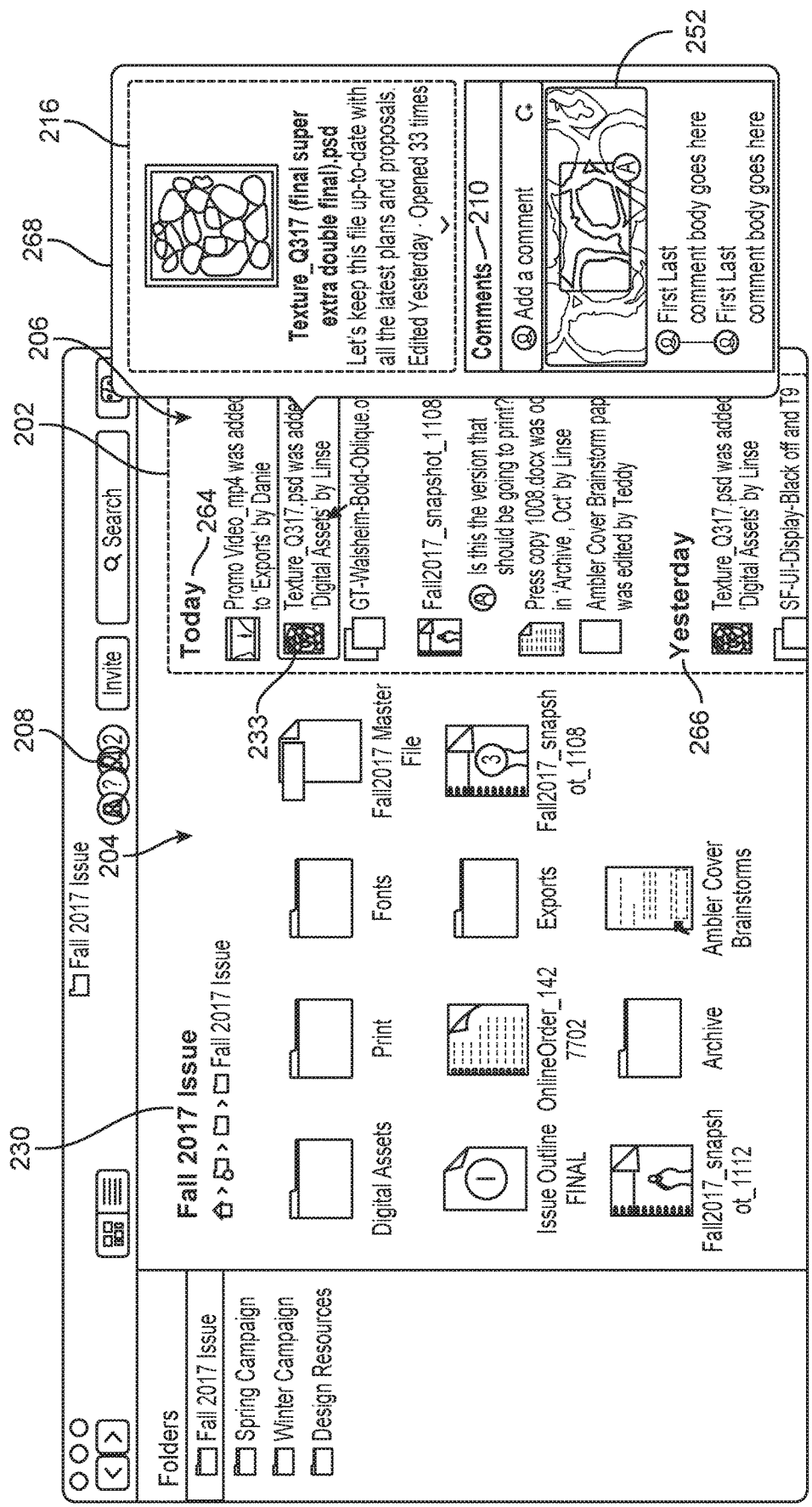
FIG. 15 shows an example details pane and a popout window where the popout window shows details for a content item associated with a selected activity in accordance with some aspects of the present technology.

FIG. 15 illustrates an example of file browser interface 200 with details pane 202 showing activity for subfolder 230 "Fall 2017 Issue". As illustrated in FIG. 15, activity section 206 includes comments grouped into categories based on the day the activity was recorded—specifically grouping 264 for comments recorded "today" and grouping 266 for comments recorded "yesterday."

Additionally, FIG. 15 illustrates activity 233 pertaining to content item 217 having been selected. Details pane service 162 can receive the selection of activity 233 and display details pane popout window 268 showing details specific to content item 217, including a content item preview in preview section 216 and preview 252 showing the location in which comments in comments section 210 are anchored within content item 217.

As introduced above, some content items may be conducive to presenting dynamic previews for these content items. For example, content items written in a markup language, or cloud content items such as a content item that is stored in an online document service (e.g., a Paper document, by Dropbox Inc., or a Google Doc, by Google Inc.), may be rendered directly by details pane service 162. Other content items may be dynamically renderable through assistance of service accessible via an API. Some content items can be dynamically renderable by providing a webview that displays a portion of the content item opened on a content management system. Dynamically renderable previews may be interacted with directly in the preview pane such that edits or additional comments can be made without opening the content item in a default application used to edit the content item.

Figure 16:
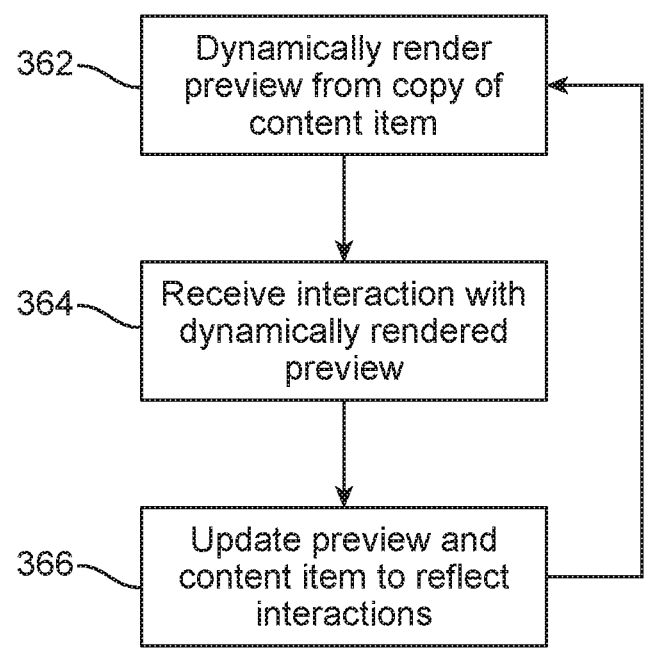
FIG. 16 shows an example method embodiment for rendering and interacting with a dynamic preview in accordance with some aspects of the present technology.

FIG. 16 illustrates an example method for rendering and interacting with dynamically rendered previews. When details pane service 162 determines that a preview should be presented for a content item for which a preview is dynamically renderable, details pane service 162 can dynamically render (362) the preview from a copy of the content item.

As noted above, dynamically renderable previews can receive interactions and edit directly in the preview. As such, details pane service 162 can receive (364) interaction with the dynamically rendered preview by way of receiving a user input into the dynamically rendered preview displayed in details pane 202 (262 or 268). Details pane service 162 can update (366) the preview and the content item itself in response to the received (364) interactions. In this way, quick changes can be made to the content item without having to open the content item in a default application. The changes can be reflected directly in the preview, which remains available for continued interaction until the user opens the content item in a native application, selects another content item, or closes file browser interface 200.

FIG. 17A and FIG. 17B show example detail panes 222 showing an example of dynamically rendered content item previews shown in preview section 216. In the example in FIG. 17A, the dynamically rendered document preview is shown in collapsed preview section 216 and in FIG. 17B the dynamically rendered preview is shown in an expanded preview section 216. As addressed with respect to FIG. 12A and FIG. 12B, preview section 216 can be switched from collapsed to expanded views through selection of user interface control 232.

The dynamically rendered preview shows a check list that can be interacted with to provide updates to both the preview and the underlying content item as explained with respect to FIG. 15. In some embodiments, the preview can be taken from metadata stored with the content item. For example, some content items can be stored with workflow information, such as a to-do list. In such embodiments, a possible preview would include displaying the to-do list. In some embodiments, the to-do list is a portion of the content item itself. In some embodiments, the to-do list can be stored in a companion metadata file.

In some embodiments, where the preview is a dynamically rendered preview, it can be possible to not only make changes to the portion of the content item shown in preview section 216, but it may also be possible to navigate to other sections of the document. If the content item is a web document, such as a web page, it may be possible to navigate Internet content by clicking on links in the content item.

Dynamically rendered previews can be provided by including one or more content authoring applets within or associated with details pane service 162. The content authoring applets can include enough code to render specific document types, or at least portions of specific document types within preview section 216 of details pane 202. In some embodiments, the dynamically rendered preview can be displayed within a frame under the control of the content authoring applet.

In some embodiments, the content authoring applet can include code to render the entire content item, and when rendering the content item, can format the contents of the content item for display within preview section 216. Additionally, the applet can permit scrolling through the contents of the content item.

In some embodiments, the content authoring applet can include only limited features as compared to a default application typically used to view and edit the type of content item. For example, only basic editing and commenting features may be available.

In some embodiments, the content authoring applet can be configured to only render limited portions of the content item. For example, only portions of the content item to which comments are attached, or only portions containing a checklist might be renderable. In some embodiments, portions of the content item can be tagged to be available to be displayed as a dynamically renderable preview.

In some embodiments, the content authoring applet can be configured to render a web view through communication with web interface service 124. Such embodiments can be useful to depend on content management system 110 to have the capability to render diverse content items in a web view. For example, content management system 110 can have the capability to open files specific to a particular document editor, or a particular image editor, or a particular spreadsheet application, and can provide a web view of the content item using web interface service 124. In such embodiments, even though a content item has been selected on client device 150 and for which a version maybe stored locally, it will be a version of the content item stored at content management system 110 that is opened for the purposes of generating and interacting with the dynamic preview. Any changes made to the content item can be saved to content management system 110 and synchronized to the copy stored on client device 150.

Similarly, in embodiments wherein the content item is a collaborative content item, the content authoring applet can be configured to render a web view of the online service that supports the content item. For example, a collaborative content item can be rendered by the content authoring applet that is communicating with collaborative document service 134.

While rendering dynamic content item previews by content authoring applet hosting a web view of the content item can be useful in many circumstances, it is less useful when client device 150 is not connected to the Internet. In such embodiments, even if the default behavior of the content authoring applet is to host a web view in coordination with a web server, content authoring applet can contain a local resource library that is effective to permit local content items to be rendered without coordination with a web server. In some embodiments, when documents are rendered in this fashion, the formatting of the document, or the features available may be limited.

When a dynamically renderable preview receives an edit, the edit can be saved in the content item itself (a locally stored version if the dynamic preview is rendered from the locally stored version, or a content management system stored version if the dynamic preview is provided in a web view).

In some embodiments, the content items are managed by synchronized content management service 110, and when changes to a version of a content item are saved as described above, these changes can be synchronized with other copies saved at content management system 110 or other client devices 150.

Figure 18:
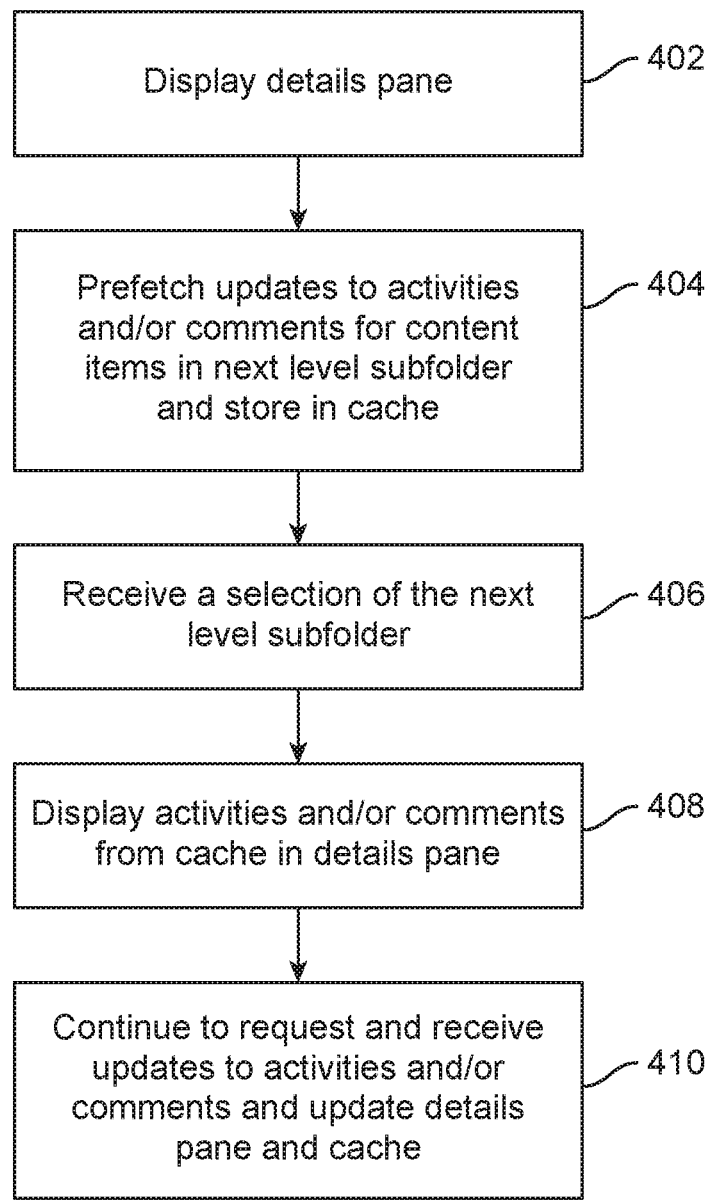
FIG. 18 shows an example method embodiment for pre-fetching activities or comments in accordance with some aspects of the present technology.

In some embodiments, a better user experience can be provided if activities and comments to be provided in details pane 202 are cached before they are required, or pre-fetched, allowing the activities and comments to be provided more quickly. FIG. 18 illustrates an example method for prefetching activities and comments to be displayed in details pane 202. Details pane service 162 displays (402) details pane 202 for a folder or content item within a folder. Details pane service 162 can pre-fetch (404) updates to activities and/or comments for content items that are stored in a lower level subfolder than the folder for which information is currently displayed in details pane 202. Once details pane service 162 receives an input (406) within file browser interface 200 to navigate to a different subfolder, details pane service 162 can display (408) activities and/or comments previously stored in a cache. Details pane service 162 can continue to request and receive (410) updates to activities and/or comments to update details pane 202 and the cache. In some embodiments, notification service 117 can push new activities and new comments to client device 150, and these can also be stored in cache.

In embodiments wherein activities and comments are pre-fetched as described above, it may be beneficial to utilize a more intelligent system than to simply request and download all activity and comments for all content items in a next lower level subfolder. Some folders may still have many content items in the next level of subfolders and thus downloading activities and comments for these content items may be time consuming and require a lot of bandwidth. Furthermore, users may navigate through a directory structure more quickly than the comments and activities can be pre-fetched. Accordingly, in some embodiments, the method illustrated in FIG. 18 can be modified to pre-fetch activities and comments according to a pre-fetching priority score.

A pre-fetching priority score can be determined for each content item to ascertain a relative priority for pre-fetching comments and activities for content items. In some embodiments, the pre-fetching priority score can be dynamically updated as factors relevant to determining the pre-fetching priority score change. The pre-fetching priority score can be an estimate of the probability that the user will want to access each particular content item on their client device 150.

In some embodiments, the pre-fetching priority score is based on a recency criteria such as examining a last-opened date on the client device, a last-opened date on another device, a last-modified metadata value, a last shared date, how recently the content item opened or edited by another user with which the content item is shared, etc.

In some embodiments, the pre-fetching priority score is based on a value representing whether or not or representing a degree to which a user explicitly marks a content item as subjectively important, as a favorite item, etc.

In some embodiments, the pre-fetching priority score is based on a value representing how frequently a content item is changed or accessed in the content management system.

In some embodiments, the pre-fetching priority score is based on a value representing how many user accounts are interacting with a content item over a period of time.

The pre-fetching priority score can be based on any combination of the above or other factors.

FIG. 19 shows an example of computing system 500, which can be for example any computing device making up client device 150, content management system 110 or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions, the instructions, when executed by one or more processors, cause the one or more processors to:
    display a file browser interface on a client device, the file browser interface including a main pane comprising a content items listing section and a context pane next to the main pane, wherein the main pane provides navigation to a directory in a user account of a content management system and displays one or more content items in the directory, and wherein the context pane displays activity data and one or more comments associated with the one or more content items displayed at the main pane;
    receive a selection of a content item of the one or more content items at the main pane;
    in response to the selection of the content item at the main pane, update the context pane to display a dynamic preview section and activity data and one or more comments specific to the selected content item, the dynamic preview section previews at least a portion of the selected content item listed in the content items listing section without opening the selected content item by displaying a dynamic preview of a copy of the selected content item;
    receive, via the file browser interface, at least one edit at the dynamic preview section and dynamically updating the dynamic preview displayed at the dynamic preview section to reflect the at least one edit without opening the selected content item; and
    in response to the receiving of the at least one edit at the dynamic preview section, save the copy of the selected content item that reflects the at least one edit.

2. The non-transitory computer readable medium of claim 1, wherein the copy of the selected content item that reflects the at least one edit is synchronized to replace a remote version of the selected content item.

3. The non-transitory computer readable medium of claim 2, wherein the edit is saved in the selected content item without opening the selected content item in a default application for editing the selected content item.

4. The non-transitory computer readable medium of claim 1, wherein the dynamic preview is rendered by a content authoring applet in the dynamic preview section of the file browser interface, wherein the content authoring applet includes instructions to:
    read contents of the selected content item by a content authoring applet;
    display the dynamic preview; and
    receive a user input in the dynamic preview effective to display a new portion of the contents of the selected content item.

5. The non-transitory computer readable medium of claim 1, wherein the dynamic preview can be a webpage, and can navigate links of the webpage from within the file browser interface.

6. The non-transitory computer readable medium of claim 1, the instructions cause a computing system to:
    display a webview of a content management system stored version of the selected content item to render the dynamic preview in a content authoring applet within the dynamic preview section when the client device is connected to the Internet; and
    display a locally rendered view of a locally stored version of the selected content item to render the dynamic preview in a content authoring applet within the dynamic preview section when the client device is not connected to the Internet.

7. A method comprising:
    displaying a file browser interface on a client device, the file browser interface including a main pane comprising a content items listing section and a context pane next to the main pane, wherein the main pane provides navigation to a directory in a user account of a content management system and displays one or more content items in the directory, and wherein the context pane displays activity data and one or more comments associated with the one or more content items displayed at the main pane;
    receiving a selection of a content item of the one or more content items at the main pane;
    in response to the selection of the content item at the main pane, updating the context pane to display a dynamic preview section and activity data and one or more comments specific to the selected content item, the dynamic preview section previews at least a portion of the selected content item listed in the content items listing section without opening the selected content item by displaying a dynamic preview of a copy of the selected content item;
    receiving, via the file browser interface, at least one edit at the dynamic preview section and dynamically updating the dynamic preview displayed at the dynamic preview section to reflect the at least one edit without opening the selected content item; and
    in response to the receiving of the at least one edit at the dynamic preview section, saving the copy of the selected content item that reflects the at least one edit.

8. The method of claim 7, further comprising: synchronizing the copy of the selected content item that reflects the at least one edit with a remote version of the selected content item to yield a local synchronized copy of the selected content item and a remote synchronized copy of the selected content item.

9. The method of claim 8, wherein the dynamic preview includes a to-do list within the selected content item.

10. The method of claim 8, wherein the edit is saved for the selected content item without opening the selected content item in a default application for editing the selected content item.

11. The method of claim 7, wherein the dynamic preview is rendered by a content authoring applet in the dynamic preview section of the file browser interface, wherein the content authoring applet further comprises:
 reading contents of the selected content item by a content authoring applet;
 displaying the dynamic preview; and
 receiving a user input in the dynamic preview effective to display a new portion of the contents of the selected content item.

12. The method of claim 7, wherein the dynamic preview can be a webpage, and can navigate links of the webpage from within the file browser interface.

13. The method of claim 7, further comprising:
 displaying a webview of a content management system stored version of the selected content item to render the dynamic preview in a content authoring applet within the dynamic preview section when the client device is connected to the Internet; and
 displaying a locally rendered view of a locally stored version of the selected content item to render the dynamic preview in a content authoring applet within the dynamic preview section when the client device is not connected to the Internet.

14. A system comprising:
 a content management system; and
 a client device in communication with the content management system, wherein the client device stores at least a portion of a content item managed by the content management system on the client device and to:
  display a file browser interface on a client device, the file browser interface including a main pane comprising a content items listing section and a context pane next to the main pane, wherein the main pane provides navigation to a directory in a user account of a content management system and displays one or more content items in the directory, and wherein the context pane displays activity data and comments associated with the one or more content items displayed at the main pane;
  receive a selection of a content item of the one or more content items at the main pane;
  in response to the selection of the content item at the main pane, update the context pane to display a dynamic preview section and activity data and comments specific to the selected content item, the dynamic preview section previews at least a portion of the selected content item listed in the content items listing section without opening the selected content item by displaying a dynamic preview of a copy of the selected content item;
  receive, via the file browser interface, at least one edit at the dynamic preview section and dynamically updating the dynamic preview displayed at the dynamic preview section to reflect the at least one edit without opening the selected content item; and
  in response to the receiving of the at least one edit at the dynamic preview section, save the copy of the selected content item that reflects the at least one edit.

15. The system of claim 14, wherein providing the at least one edit to the selected content item without opening the selected content item further comprises synchronizing the edited selected content item with a remote version of the selected content item.

16. The system of claim 15, wherein the dynamic preview includes a to-do list within the selected content item.

17. The system of claim 14, wherein the dynamic preview is rendered by a content authoring applet in the dynamic preview section of the file browser interface, wherein the content authoring applet includes instructions to:
 read contents of the selected content item by a content authoring applet;
 display the dynamic preview; and
 receive a user input in the dynamic preview effective to display a new portion of the contents of the selected content item.

18. The system of claim 14, wherein the dynamic preview can be a webpage, and can navigate links of the webpage from within the file browser interface.

19. The system of claim 14, further causing the client device to:
 display a webview of a content management system stored version of the selected content item to render the dynamic preview in a content authoring applet within the dynamic preview section when the client device is connected to the Internet; and
 display a locally rendered view of a locally stored version of the selected content item to render the dynamic preview in a content authoring applet within the dynamic preview section when the client device is not connected to the Internet.

20. The system of claim 14, wherein the displaying the activity data and the one or more comments for the one or more content items includes displaying the activity data and comments specific to the selected content item.

21. The system of claim 14, further causing the client device to:
 receive a selection of a comment in the file browser interface, wherein the comment is anchored to a location in the selected content item;
 in response to the selection, render a dynamic preview of the selected content item showing the location in the selected content item; and
 display the rendered dynamic preview at the dynamic preview section of the file browser interface.

* * * * *